US012576987B2

(12) United States Patent
Tellechea et al.

(10) Patent No.: US 12,576,987 B2
(45) Date of Patent: Mar. 17, 2026

(54) COMPUTER-BASED SYSTEMS AND METHODS FOR FACILITATING AIRCRAFT APPROACH

(71) Applicant: Area 2601, LLC, Winter Park, FL (US)

(72) Inventors: Albert F. Tellechea, Winter Park, FL (US); Diego M. Alfonso, Orlando, FL (US); Joseph R. Collins, LaGrange, GA (US)

(73) Assignee: Area 2601, LLC, Winter Park, FL (US)

( * ) Notice: Subject to any disclaimer, the term of this patent is extended or adjusted under 35 U.S.C. 154(b) by 147 days.

(21) Appl. No.: 18/488,631

(22) Filed: Oct. 17, 2023

(65) Prior Publication Data

US 2024/0383614 A1      Nov. 21, 2024

Related U.S. Application Data

(63) Continuation-in-part of application No. 18/055,154, filed on Nov. 14, 2022, now Pat. No. 11,787,560, (Continued)

(51) Int. Cl.
*B64D 45/08*          (2006.01)
*G01C 23/00*          (2006.01)
(Continued)

(52) U.S. Cl.
CPC ............. *B64D 45/08* (2013.01); *G01C 23/00* (2013.01); *G05D 1/0202* (2013.01); (Continued)

(58) Field of Classification Search
CPC .......... B64D 45/00; B64D 45/04; G08G 5/00; G08G 5/20; G08G 5/21; G08G 5/23; (Continued)

(56) References Cited

U.S. PATENT DOCUMENTS 5,991,460 A * 11/1999 Mitchell .............. G01C 21/005
                                                    382/210
6,405,107 B1    6/2002 Derman
                        (Continued)

FOREIGN PATENT DOCUMENTS

WO      WO2005050601          6/2005

OTHER PUBLICATIONS

PCT International Searching Authority: International Search Report and Written Opinion dated Jun. 11, 2018; entire document.

*Primary Examiner* — Ramya P Burgess
*Assistant Examiner* — Sara J Lewandroski
(74) *Attorney, Agent, or Firm* — ALLEN, DYER, DOPPELT + GILCHRIST, P.A.

(57)          ABSTRACT

A graphical user interface (GUI) system for facilitating aircraft approaching and landing includes a database for storing airfields information and associated one or more approach patterns. The system also includes a display screen with user input interface configured for selecting a pattern for an aircraft to approach and land on an airfield, displaying the selected pattern in an overhead graphical view of the airfield according to the related information stored in the database. The system further includes a processing unit in signal communication with the database, one or more aircraft position sensors, and the display screen. The processing unit is configured to receive aircraft location and movement information from one or more aircraft sensors, airfield information from the database, and user input from the user input interface to determine display content and format of the display content on the display screen.

70 Claims, 36 Drawing Sheets

Related U.S. Application Data which is a continuation of application No. 17/079,956, filed on Oct. 26, 2020, now Pat. No. 11,498,697, which is a continuation of application No. 15/942,671, filed on Apr. 2, 2018, now Pat. No. 10,815,003.

(60) Provisional application No. 62/637,090, filed on Mar. 1, 2018, provisional application No. 62/542,483, filed on Aug. 8, 2017, provisional application No. 62/542,498, filed on Aug. 8, 2017, provisional application No. 62/479,401, filed on Mar. 31, 2017.

(51) Int. Cl.

| | |
|---|---|
| *G05D 1/00* | (2006.01) |
| *G06F 3/0489* | (2022.01) |
| *G08G 5/00* | (2025.01) |
| *G08G 5/02* | (2006.01) |
| *G08G 5/21* | (2025.01) |
| *G08G 5/50* | (2025.01) |
| *G08G 5/54* | (2025.01) |
| *G08G 5/55* | (2025.01) |
| *G08G 5/74* | (2025.01) |
| *G08G 5/76* | (2025.01) |

(52) U.S. Cl.
CPC ............ *G06F 3/0489* (2013.01); *G08G 5/21* (2025.01); *G08G 5/50* (2025.01); *G08G 5/54* (2025.01); *G08G 5/55* (2025.01); *G08G 5/74* (2025.01); *G08G 5/76* (2025.01)

(58) Field of Classification Search
CPC .. G08G 5/24; G08G 5/25; G08G 5/26; G08G 5/265; G08G 5/30; G08G 5/32; G08G 5/34; G08G 5/38; G08G 5/50; G08G 5/54; G08G 5/55; G08G 5/58; G08G 5/59; G08G 5/70; G08G 5/72; G08G 5/723; G08G 5/727; G01C 23/00; G01C 23/005; G05D 1/654; G05D 1/6542; G05D 1/6545
See application file for complete search history.

(56) References Cited

U.S. PATENT DOCUMENTS

| | | | | |
|---|---|---|---|---|
| 6,707,475 | B1 * | 3/2004 | Snyder ................... | G01C 23/00 701/1 |
| 9,189,964 | B1 * | 11/2015 | Rathinam ................ | G08G 5/54 |
| 9,262,932 | B1 * | 2/2016 | Barber .................... | G08G 5/25 |
| 9,423,799 | B1 * | 8/2016 | Wu ......................... | G08G 5/26 |
| 9,428,056 | B2 | 8/2016 | Kneuper et al. | |
| 2003/0120779 | A1 | 6/2003 | Rodefer et al. | |
| 2003/0206120 | A1 | 11/2003 | Ishihara et al. | |
| 2008/0201148 | A1 * | 8/2008 | Desrochers .......... | G10L 15/183 704/E15.044 |
| 2009/0030564 | A1 * | 1/2009 | Peterson ............... | G08G 5/723 701/16 |
| 2010/0094485 | A1 | 4/2010 | Verlut et al. | |
| 2010/0161156 | A1 | 6/2010 | Coulmeau et al. | |
| 2010/0262318 | A1 | 10/2010 | Ariens | |
| 2010/0305786 | A1 * | 12/2010 | Boorman ................ | G08G 5/54 701/16 |
| 2011/0144832 | A1 | 6/2011 | Mcdowell et al. | |
| 2011/0231038 | A1 * | 9/2011 | Studenny ............... | G01S 19/41 701/470 |
| 2011/0264312 | A1 | 10/2011 | Spinelli et al. | |
| 2012/0035849 | A1 | 2/2012 | Clark et al. | |
| 2014/0163784 | A1 * | 6/2014 | Parthasarathy .......... | G08G 5/32 701/15 |
| 2014/0207315 | A1 * | 7/2014 | He ........................ | G01C 23/005 701/16 |
| 2014/0277857 | A1 * | 9/2014 | Bourret ................... | G08G 5/26 701/16 |
| 2014/0331161 | A1 | 11/2014 | Venkataswamy et al. | |
| 2014/0343765 | A1 | 11/2014 | Suiter et al. | |
| 2014/0350755 | A1 * | 11/2014 | Caillaud ............... | G01C 23/00 701/18 |
| 2015/0081197 | A1 * | 3/2015 | Gaertner ................. | G08G 5/54 701/120 |
| 2015/0261379 | A1 * | 9/2015 | Kneuper ............... | B64D 43/00 345/173 |
| 2015/0356873 | A1 | 12/2015 | Kneuper et al. | |
| 2016/0012734 | A1 * | 1/2016 | Bruce ..................... | G08G 5/20 701/16 |
| 2016/0125742 | A1 * | 5/2016 | Shorter, Jr. .............. | G06F 3/00 701/528 |
| 2016/0176541 | A1 | 6/2016 | Kneuper et al. | |
| 2016/0232795 | A1 | 8/2016 | Thiele et al. | |
| 2016/0274739 | A1 | 9/2016 | Lepage et al. | |
| 2016/0351058 | A1 * | 12/2016 | Wischmeyer ........... | G08G 5/21 |
| 2016/0356626 | A1 | 12/2016 | Caillaud et al. | |
| 2017/0030735 | A1 | 2/2017 | Mohideen et al. | |
| 2017/0036776 | A1 * | 2/2017 | He .......................... | G08G 5/21 |
| 2017/0083206 | A1 | 3/2017 | He et al. | |
| 2017/0116866 | A1 | 4/2017 | Jeong | |
| 2017/0276508 | A1 * | 9/2017 | Hodge ................. | G01C 23/005 |
| 2017/0315706 | A1 | 11/2017 | Helppi et al. | |
| 2018/0181299 | A1 | 6/2018 | Ouellette et al. | |
| 2018/0232097 | A1 | 8/2018 | Kneuper et al. | |
| 2018/0268721 | A1 * | 9/2018 | McCullough ........... | G08G 5/74 |
| 2018/0281988 | A1 | 10/2018 | Tellechea et al. | |
| 2019/0278299 | A1 | 9/2019 | Reist et al. | |

* cited by examiner

104

506 ft MSL

KORL

A1
KORL
RWY 07
STD
L 1113 ft MSL

—104

| PATTERN ALTITUDE (AGL) | 1000 ft | 1500 ft | 2000 ft |
|---|---|---|---|
| BASE | 1 nm | 1.5 nm | 2 nm |
| DOWNWIND | 1 nm | 1.5 nm | 2 nm |
| ENTRY ANGLE | 45° | 45° | 45° |
|  | A1 | A1.5 | A2 |

| A1 | A1.5 | A2 |
|---|---|---|
| | | AGL |
| 1000 ft | | |
| PATTERN ALTITUDE | | |
| ENTRY ANGLE | BASE | DOWNWIND |
| 1 | 2 | 3 |
| 4 | 5 | 6 |
| 7 | 8 | 9 |
| . | 0 | DEL |
| CANCEL | ACCEPT | |

| A1 | A1.5 | A2 |
|---|---|---|
| 3 nm | | |
| EXTEND DOWNWIND | | |
| 1 | 2 | 3 |
| 4 | 5 | 6 |
| 7 | 8 | 9 |
| . | 0 | DEL |
| CANCEL | ACCEPT | |

| A1 | A1.5 | A2 |
|---|---|---|
| 1 nm | | |
| REPORT DISTANCE | | |
| 1 | 2 | 3 |
| 4 | 5 | 6 |
| 7 | 8 | 9 |
| . | 0 | DEL |
| CANCEL | ACCEPT | |

| A1 | A1.5 | A2 |
|---|---|---|
| 3° | | |
| GLIDEPATH ANGLE | | |
| 1 | 2 | 3 |
| 4 | 5 | 6 |
| 7 | 8 | 9 |
| . | 0 | DEL |
| CANCEL | ACCEPT | |

RUNWAY BEARING

—104

—104

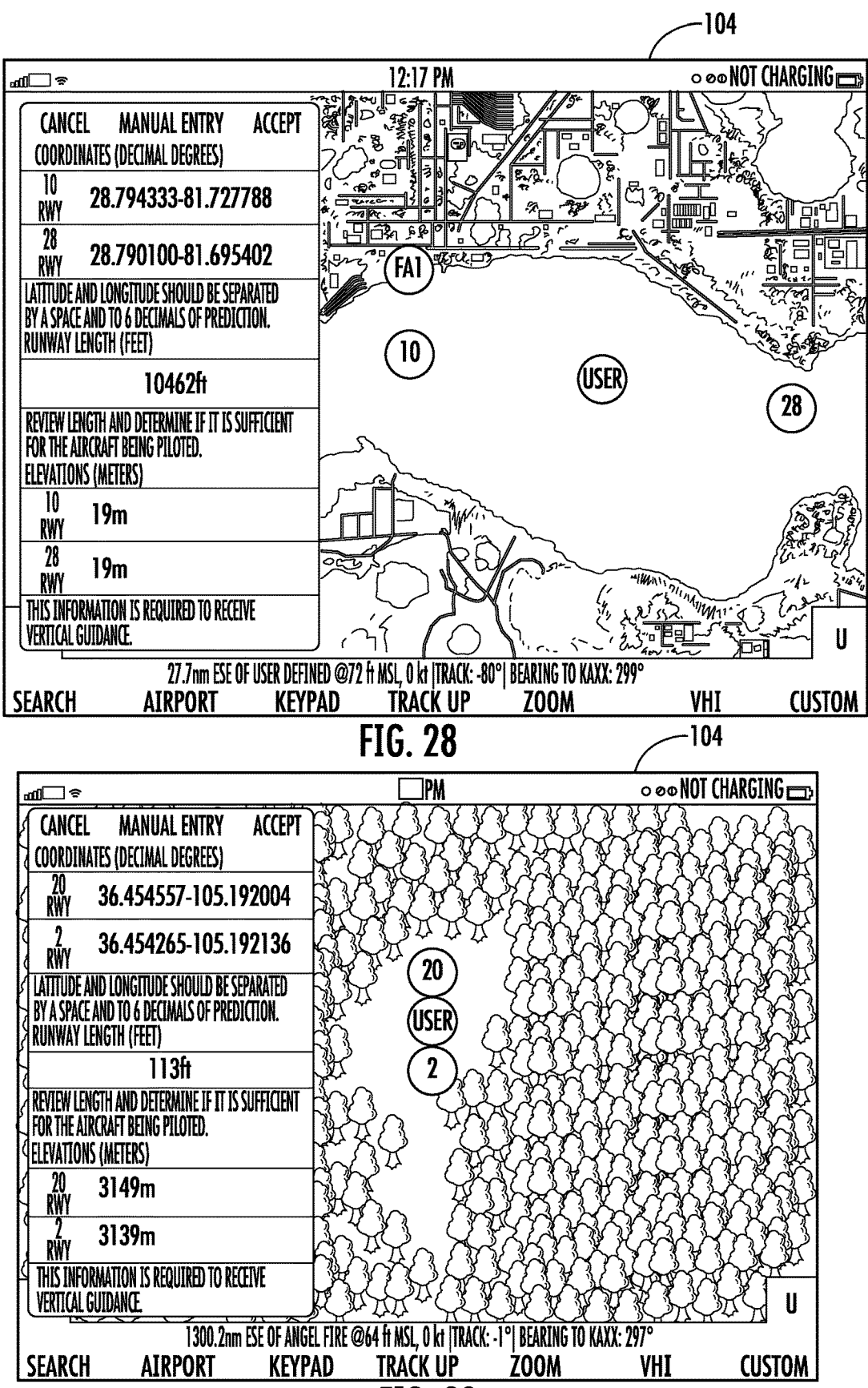

104

12:17 PM                              NOT CHARGING

CANCEL      MANUAL ENTRY      ACCEPT
COORDINATES (DECIMAL DEGREES)

| 10 RWY | 28.794333-81.727788 |
| 28 RWY | 28.790100-81.695402 |

LATITUDE AND LONGITUDE SHOULD BE SEPARATED BY A SPACE AND TO 6 DECIMALS OF PREDICTION.
RUNWAY LENGTH (FEET)

10462ft

REVIEW LENGTH AND DETERMINE IF IT IS SUFFICIENT FOR THE AIRCRAFT BEING PILOTED.
ELEVATIONS (METERS)

| 10 RWY | 19m |
| 28 RWY | 19m |

THIS INFORMATION IS REQUIRED TO RECEIVE VERTICAL GUIDANCE.

27.7nm ESE OF USER DEFINED @72 ft MSL, 0 kt |TRACK: -80°| BEARING TO KAXX: 299°

SEARCH      AIRPORT      KEYPAD      TRACK UP      ZOOM      VHI      CUSTOM

☐PM                              NOT CHARGING

CANCEL      MANUAL ENTRY      ACCEPT
COORDINATES (DECIMAL DEGREES)

| 20 RWY | 36.454557-105.192004 |
| 2 RWY | 36.454265-105.192136 |

LATITUDE AND LONGITUDE SHOULD BE SEPARATED BY A SPACE AND TO 6 DECIMALS OF PREDICTION.
RUNWAY LENGTH (FEET)

113ft

REVIEW LENGTH AND DETERMINE IF IT IS SUFFICIENT FOR THE AIRCRAFT BEING PILOTED.
ELEVATIONS (METERS)

| 20 RWY | 3149m |
| 2 RWY | 3139m |

THIS INFORMATION IS REQUIRED TO RECEIVE VERTICAL GUIDANCE.

1300.2nm ESE OF ANGEL FIRE @64 ft MSL, 0 kt |TRACK: -1°| BEARING TO KAXX: 297°

SEARCH      AIRPORT      KEYPAD      TRACK UP      ZOOM      VHI      CUSTOM

FIG. 29

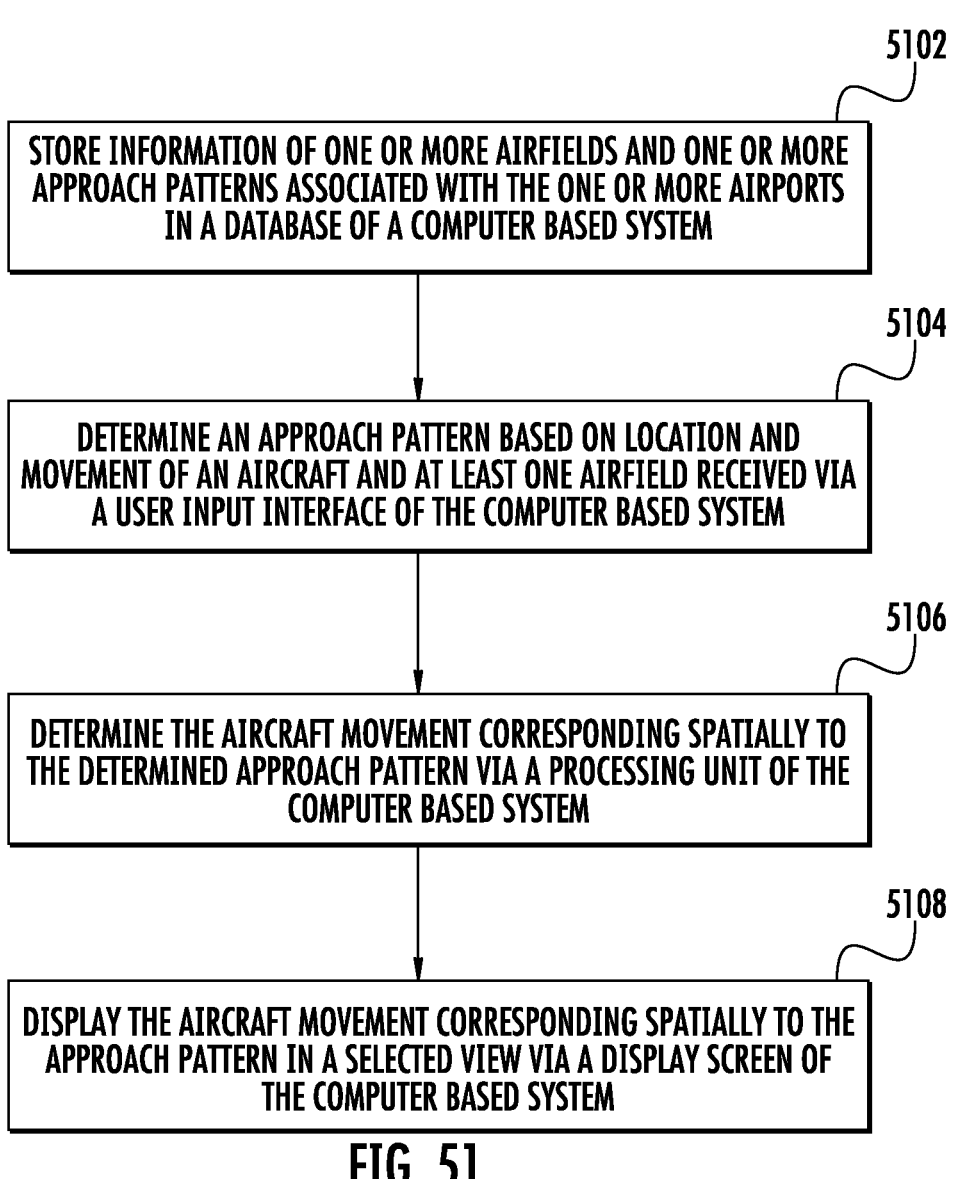

5102

STORE INFORMATION OF ONE OR MORE AIRFIELDS AND ONE OR MORE APPROACH PATTERNS ASSOCIATED WITH THE ONE OR MORE AIRPORTS IN A DATABASE OF A COMPUTER BASED SYSTEM

5104

DETERMINE AN APPROACH PATTERN BASED ON LOCATION AND MOVEMENT OF AN AIRCRAFT AND AT LEAST ONE AIRFIELD RECEIVED VIA A USER INPUT INTERFACE OF THE COMPUTER BASED SYSTEM

5106

DETERMINE THE AIRCRAFT MOVEMENT CORRESPONDING SPATIALLY TO THE DETERMINED APPROACH PATTERN VIA A PROCESSING UNIT OF THE COMPUTER BASED SYSTEM

5108

DISPLAY THE AIRCRAFT MOVEMENT CORRESPONDING SPATIALLY TO THE APPROACH PATTERN IN A SELECTED VIEW VIA A DISPLAY SCREEN OF THE COMPUTER BASED SYSTEM

FIG. 51

COMPUTER-BASED SYSTEMS AND METHODS FOR FACILITATING AIRCRAFT APPROACH

CROSS-REFERENCE TO RELATED APPLICATION

This application is a continuation-in-part of U.S. Non-provisional patent Ser. No. 18/055,154, filed on Nov. 14, 2022, which is a continuation of U.S. patent application Ser. No. 17/079,956, filed on Oct. 26, 2020, which is a continuation of U.S. patent application Ser. No. 15/942,671, filed Apr. 2, 2018, which claims the benefit of U.S. Provisional Patent Application Ser. No. 62/479,401, filed on Mar. 31, 2017, U.S. Provisional Patent Application Ser. No. 62/542, 498, filed on Aug. 8, 2017, U.S. Provisional Patent Application Ser. No. 62/542,483, filed on Aug. 8, 2017, and U.S. Provisional Patent Application Ser. No. 62/637,090, filed on Mar. 1, 2018, the contents of which applications are herein incorporated by reference in their entirety.

FIELD OF THE INVENTION

The present invention relates to computer-based flight aids, and more particularly, to systems and methods for facilitating approaches and landings conducted under visual and instrument flight rules (VFR).

BACKGROUND OF THE INVENTION

Numerous computer-based tools have been developed to assist pilots with various aspects of flying an airplane. For example, navigational programs exist that allow a pilot to enter a destination and/or waypoints for a trip and have the same displayed on a moving map, along with a recommended course and speed. Instrument landing systems (ILSs) also exist that provide visual indications to guide a pilot during landing. While such systems have proved useful and reliable, further improvements are possible.

For instance, many approaches and landings are made under visual flight rules (VFR). While clear guidelines exist as to the requirements for VFR approaches and landings, implementing those guidelines in the cockpit while also piloting the aircraft under stressful conditions can be a significant challenge, even for experienced pilots. During an approach, a pilot can have to monitor other traffic, handle communications and land the plane—under the constraints of the VFR approach and landing guidelines.

In addition, landing on a moving runway such as a flight deck of an aircraft carrier is one of the most difficult things a navy pilot will ever do. A flight deck is only a short runway but a moving one. Therefore, a system with automatic runway computing and an intuitive display of the landing profile will greatly benefit a pilot in landing on a moving runway.

SUMMARY OF THE PRESENT INVENTION

In view of the foregoing, it is an object of the present invention to provide computer-based systems and methods for facilitating aircraft approaches to runways. In particular, it is an object of the invention to provide a graphical user interface that will allow a user to select quickly and intuitively a desired VFR approach pattern for a runway and provide a visual depiction of the selected pattern.

According to one embodiment of the present invention, a graphical user interface (GUI) system for facilitating aircraft approaching and landing includes a database for storing airfields information and associated one or more approach patterns. The system also includes a display screen with user input interface configured for selecting a pattern for an aircraft to approach and land on an airfield, displaying the selected pattern in an overhead graphical view of the airfield according to the related information stored in the database. The system further includes a processing unit in signal communication with the database, one or more aircraft position sensors, and the display screen. The processing unit is configured to receive aircraft location and movement information from one or more aircraft sensors, airfield information from the database, and user input from the user input interface to determine display content and format of the display content on the display screen.

According to another embodiment of the present invention, a computer-based system for facilitating aircraft approach and landing includes a user input interface configured for selecting and approaching an airfield and a display format and a processing unit in signal communication with the database and user input interface. The processing unit is configured for determining aircraft position and movement in relation to the selected airfield and calculating an approach pattern based on the aircraft position and the selected airfield. The system further includes a display screen configured for displaying the aircraft movement corresponding spatially to the calculated approach pattern in a selected display format.

According to another embodiment of the present invention, a computer-based GUI system for facilitating aircraft approaching and landing on a moving runway includes a runway position determination unit configured to determine location and movement of a moving runway in real time. A processing unit is configured to receive aircraft location and movement information from an aircraft location sensor and receive runway location and movement information from the runway determination unit. The processing unit is configured to determine an approach pattern based on real time location data for the aircraft and the runway. The system further includes a display screen with a user input interface configured for approaching the input runway based on associated airfield information and a specific display format displaying the calculated pattern in the specific display format.

According to one embodiment of the present invention, a method for facilitating aircraft approach includes storing information of one or more airfields and one or more approach patterns associated with the one or more airfields in a database of a computer-based system. An approach pattern is selected based on location and movement of an aircraft and an airfield received via a user input interface of the computer-based system. The aircraft movement corresponding spatially to the selected approach pattern is calculated via a processing unit of the computer-based system. The aircraft movement corresponding spatially to the approach pattern is displayed in a selected view via a display screen of the computer-based system.

These and other objects, aspects and advantages of the present invention will be better appreciated in view of the drawings and following detailed description of preferred embodiments.

BRIEF DESCRIPTION OF THE DRAWINGS

FIG. 28 illustrates a screen view of a landing site creation for a sea plane;

FIGS. 29-32 illustrate an overhead graphical view of various display screen for a helicopter vertical landing;

FIG. 51 is a flowchart illustrating a method for facilitating aircraft approaching and landing, according to another embodiment of the present invention.

DETAILED DESCRIPTION OF PREFERRED EMBODIMENTS

According to an embodiment of the present invention, a computer-based system and method for facilitating aircraft approach are implemented on a computer device including one or more processors, memory storage devices, user input devices and displays. Preferably, the computer device is further configured to transmit and receive data via a network, such as the Internet and/or other local or wide area network. The computer device can be implemented in any form, but a personal electronic device such as a tablet computer or smart phone with a touch-screen display is a preferred embodiment. Additionally, the computer device could be configured for integration into the instrument panel of an aircraft. Moreover, the computer device could be integrated into or configured to interface with other aircraft systems (e.g., an autopilot system, navigational system, etc.), as well as control systems external to the aircraft (e.g., some type of active ground-based control or tracking system).

Figure 1:
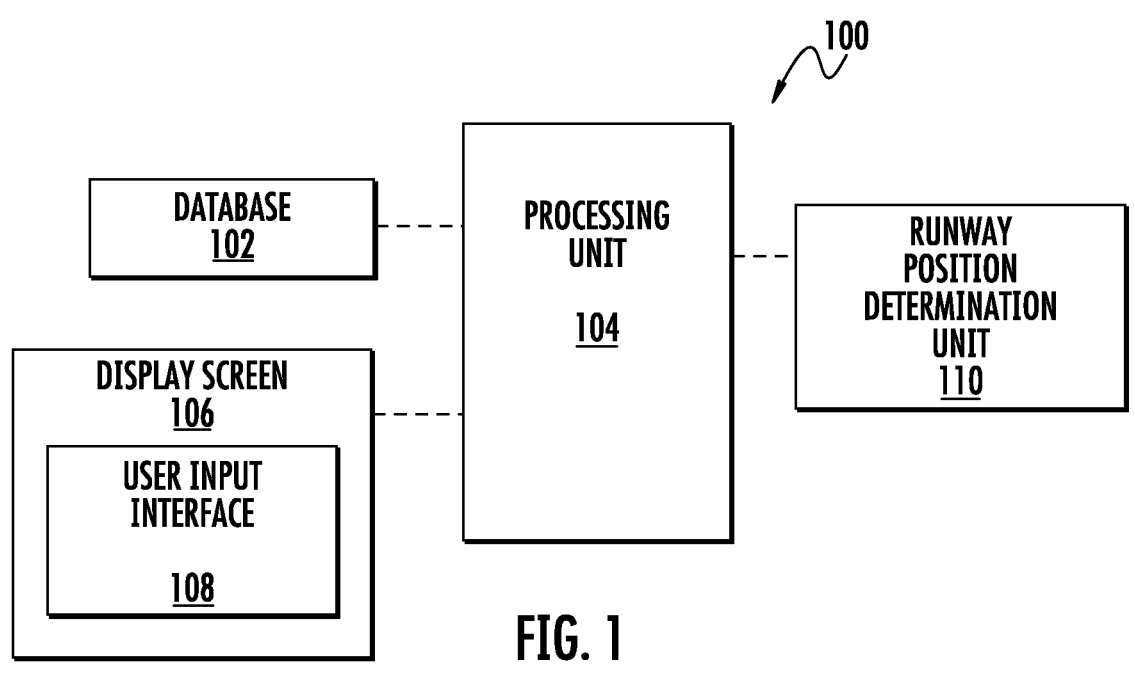
FIG. 1 is a block diagram of the system for facilitating aircraft approaching and landing, according to another embodiment of the present invention.
Figure 2:
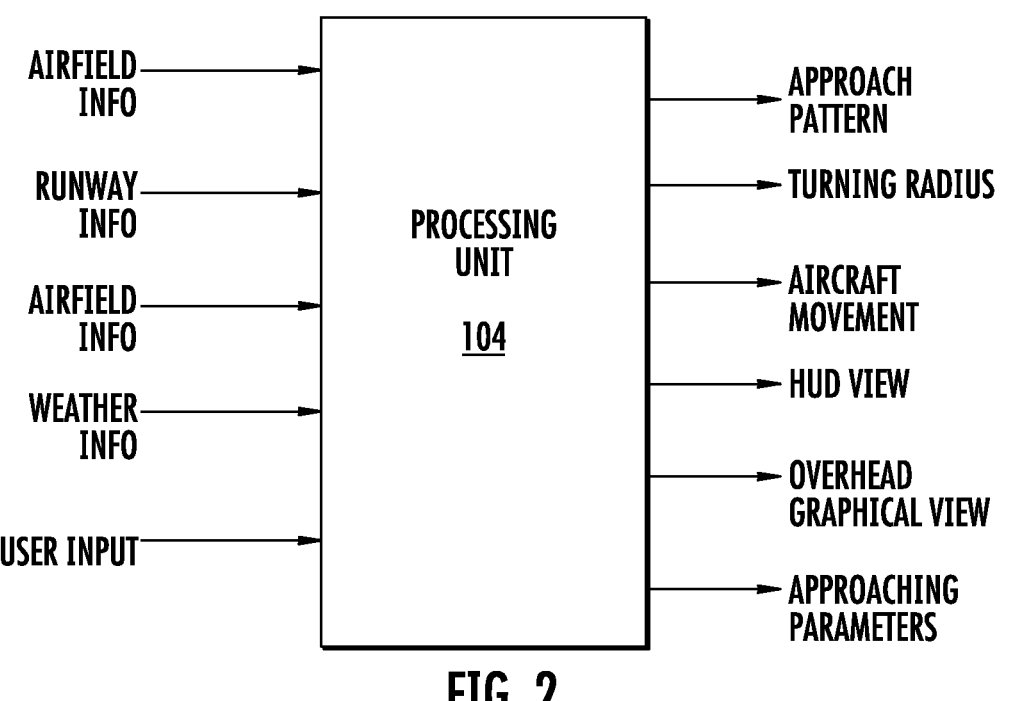
FIG. 2 is another block diagram of the system for facilitating aircraft approaching and landing, according to another embodiment of the present invention.

Referring to FIGS. 1 and 2, according to one embodiment of the present invention, a GUI system 100 for facilitating aircraft approaching and landing can include a database 102, a display screen 104 with a user input interface 106, and a processing unit 108.

The database 102 is configured for storing airfield information and one or more associated approach patterns for many airfields. As an example, the airfield information stored in the database 102 can include airfield information, runway information and runway end information for a particular airfield. The airfield information can include coordinates, an identifier, a designator, a location indicator, name, type, filed elevation, ownership type, manager and radio frequency associated with one or more airfields. The runway information can include an identifier, designator, length, width, composition, surface condition, and longitude and latitude of runway ends. The runway end information can include an identifier, a designator, coordinates, bearing, elevation, elevation of a touchdown zone, and a glide path associated with the runway end.

The user input interface 106 is configured for selecting an approach pattern for aircraft approaching and landing and displaying the selected pattern in an overhead graphical view of the corresponding airfield according to the related information stored in the database 102.

The display screen 104 is configured to display an overhead graphical view such as an aerial view or a satellite view. As an example, airfield, runway, pattern altitude, entry angle, and respective lengths associated with a downwind base leg and one or more altitude gates, descent gates, and glide path guidance indicator are displayed in the overhead graphical view. The display screen 104 is further configured for displaying an airfield information diagram and a standard aviation chart. The display screen 104 can also display one or more of aircraft coordinates, altitude, horizontal accuracy, vertical accuracy, course, speed, and timestamp of the aircraft in real-time.

The display screen 104 is further configured to display a head-up display (HUD) superimposed on a camera view. As an example, a full screen HUD is displayed. As another example, a split view is displayed. In this case, a HUD superimposed on a camera view is displayed on one side of the display screen 104 and an overhead graphical view of an airfield to be approached is displayed on the other side of the display screen 104. The HUD view can include a guidance box configured to indicate an aircraft real-time position in relation to a selected approach pattern.

The display screen 104 can be updated periodically in response to aircraft movement. The display screen 104 can be configured to use colored indicators to distinguish between different types of airfields (e.g., public, private, military, helicopter and seaplane base).

The user input interface 106 includes a data entry keypad. The data entry keypad is dynamically updated based on an approach pattern and current location of the aircraft relative to the approach pattern. For example, a first keypad is displayed to select an airfield (e.g., text entry search). As another example, a second keypad is displayed to select an approach pattern. As another example, a third keypad is displayed to modify a selected approach pattern. As another example, a fourth keypad is displayed to define a landing lane and a corresponding approach pattern.

The system processing unit 108 is configured to receive aircraft location and movement information from the one or more aircraft sensors, airfield information from the database 102, and user input from the user input interface 106, to determine display content and format of the display content on the display screen. As an example, the aircraft location and movement information includes global positioning system (GPS), and inertial navigation system (INS) system, a camera, and a laser sensor, computer vision, and the like. For example, at least one camera and computer vision can acquire, process, and analyze video digital images obtained by one or more camera, and extract high-dimensional data from the real world in order to produce numerical or symbolic information. As such, visual images is transformed into numerical and/or symbolic information (e.g., location information, moving speed, etc.) that can interface with thought processes of the procession unit 108.

As an example, the processing unit 108 is configured to select a default approach pattern based on aircraft location and movement. As another example, the processing unit 108 is configured to calculate or update automatically an approach pattern if a previously selected pattern does not apply to current aircraft location and movement. As another example, the processing unit 108 is configured to calculate one or more turning radii of an approach pattern based on aircraft location, movement and weather condition. As another example, the processing unit 108 can receive a calculated approach pattern from a third party (e.g., a air traffic control system).

According to another embodiment of the present invention, when a runway is moving, the system further includes a runway position determination unit 110 configured to determine runway location and movement in real-time. For example, the runway position determination unit 110 is configured to receive signals indicating location and orientation of the runway from one or more transmitters on the moving runway. In this case, the processing unit 108 is further configured to receive runway location and movement information from the runway determination unit and determine an approach pattern based on real time location of the aircraft and runway. Alternatively or additionally, runway information can be manually input by a user (e.g., pilot). The processing unit 108 is configured to account for the real-time location of the moving runway in calculating aircraft movement corresponding spatially to the selected approach pattern.

Figures 3, 4:
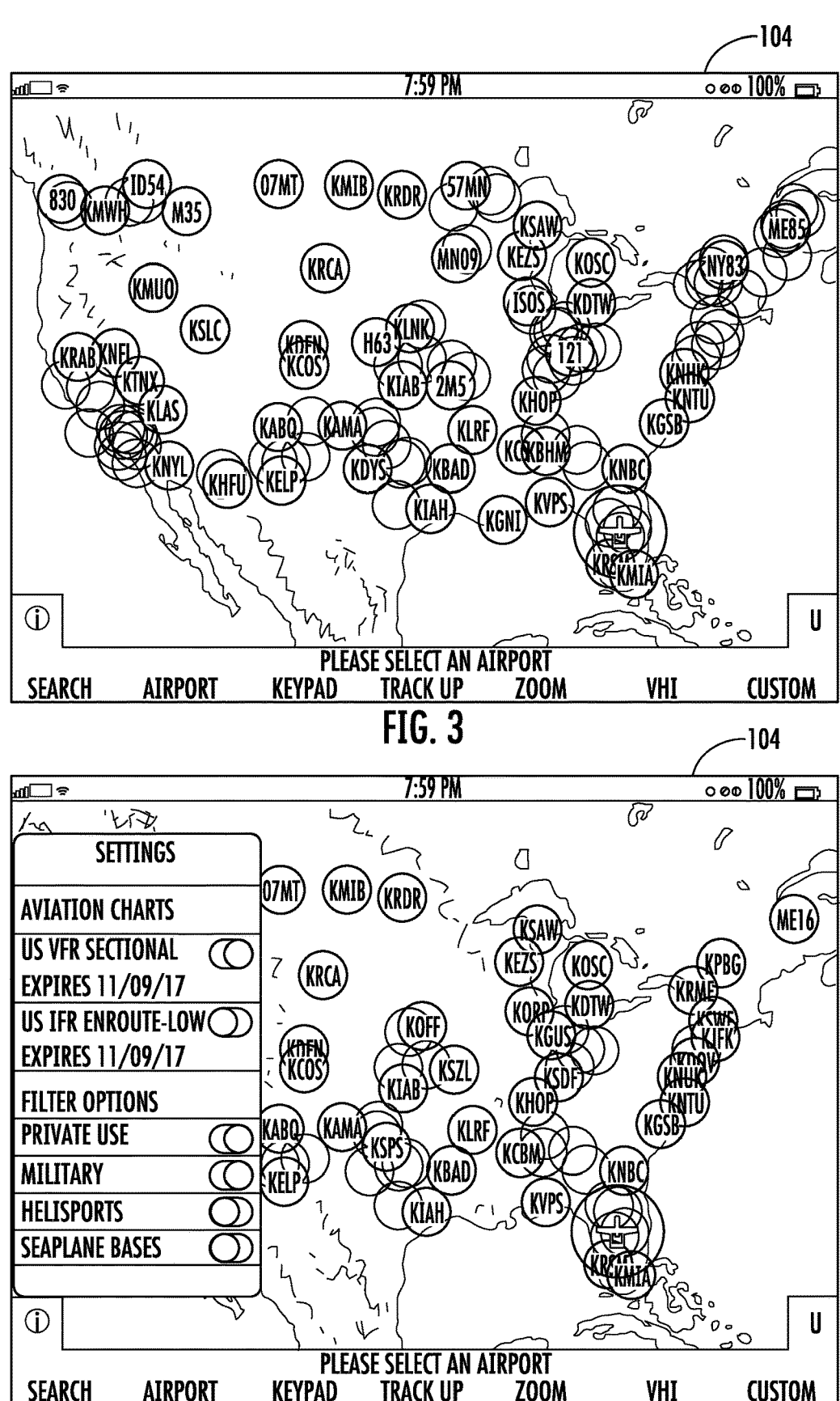
FIG. 3 is a screen view of an airfield selection screen of a computer-based system for facilitating aircraft approach, according to an embodiment of the present invention.
FIG. 4 is another screen view of an airfield selection screen of the system, according to another embodiment of the present invention.

Referring to FIG. 3, an opening page on the display screen of the GUI system 100 includes a plurality of circles and each circle represents an airfield. A pinch gesture to zoom in will display more airfields. The circles are color codes with each color representing a different type of airfield. Referring to FIG. 4, the number of airfields can be filtered by a user indicating the type of airfield to be displayed. Airfield information and the associated one or more approach patterns can be stored in a database.

Figures 5, 6:
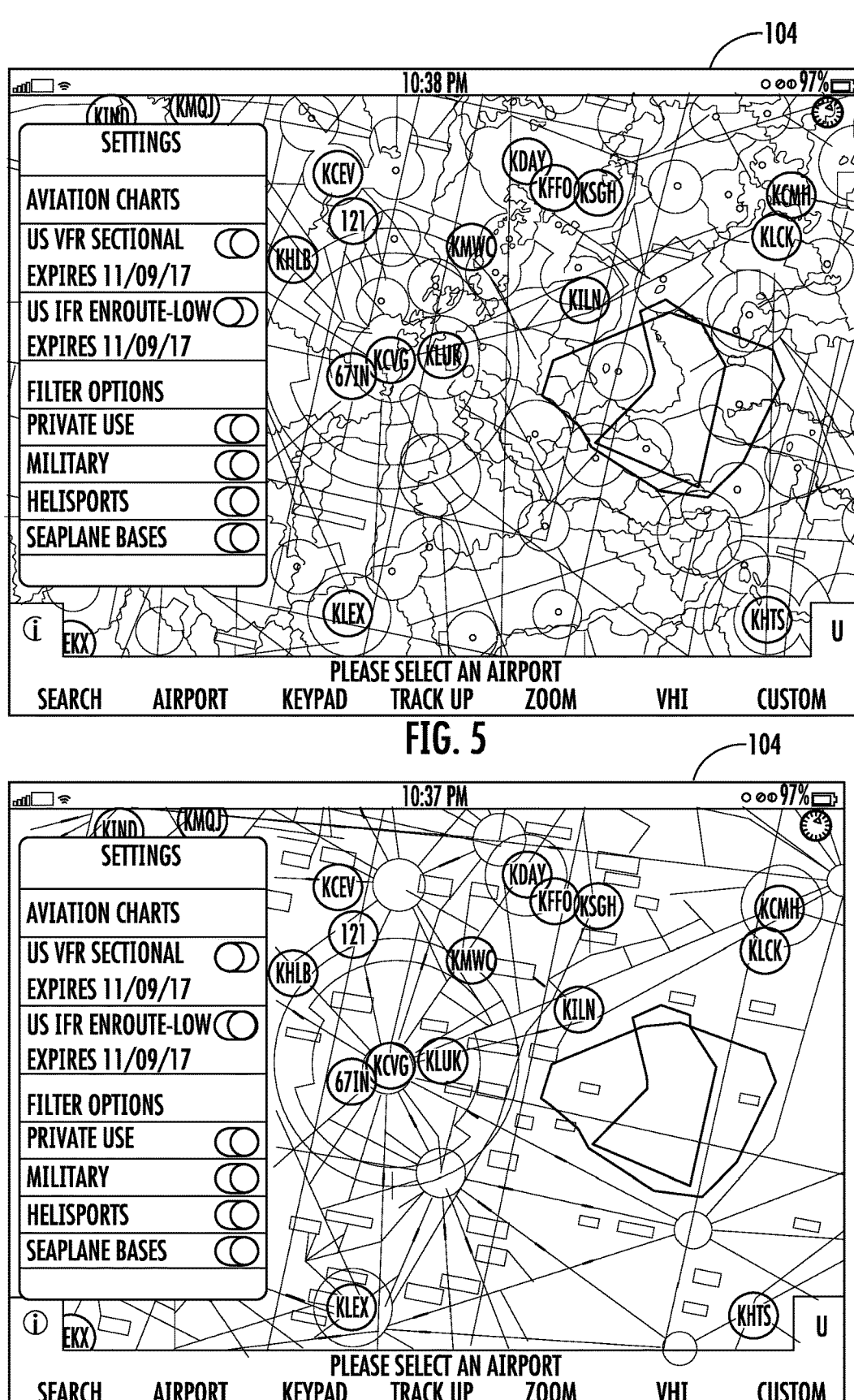
FIG. 5 is a screen view of a VFR sectional chart of the system, according to another embodiment of the present invention.
FIG. 6 is a screen view of a IFR chart of the system, according to another embodiment of the present invention.

The display screen 104 is configured to display an overhead graphical view of an airfield to be approached. For example, referring to FIG. 5, when the user selects "US VFR Sectional" view, the VFR sectional view of a corresponding area is displayed. As another example, referring to FIG. 6, when user selects "US IFR Enroute-Low" view, the IFR Enroute-Low chart of the corresponding area will be displayed. Other views can be displayed, such as standard aviation charts and airfield information diagrams.

Figure 7:
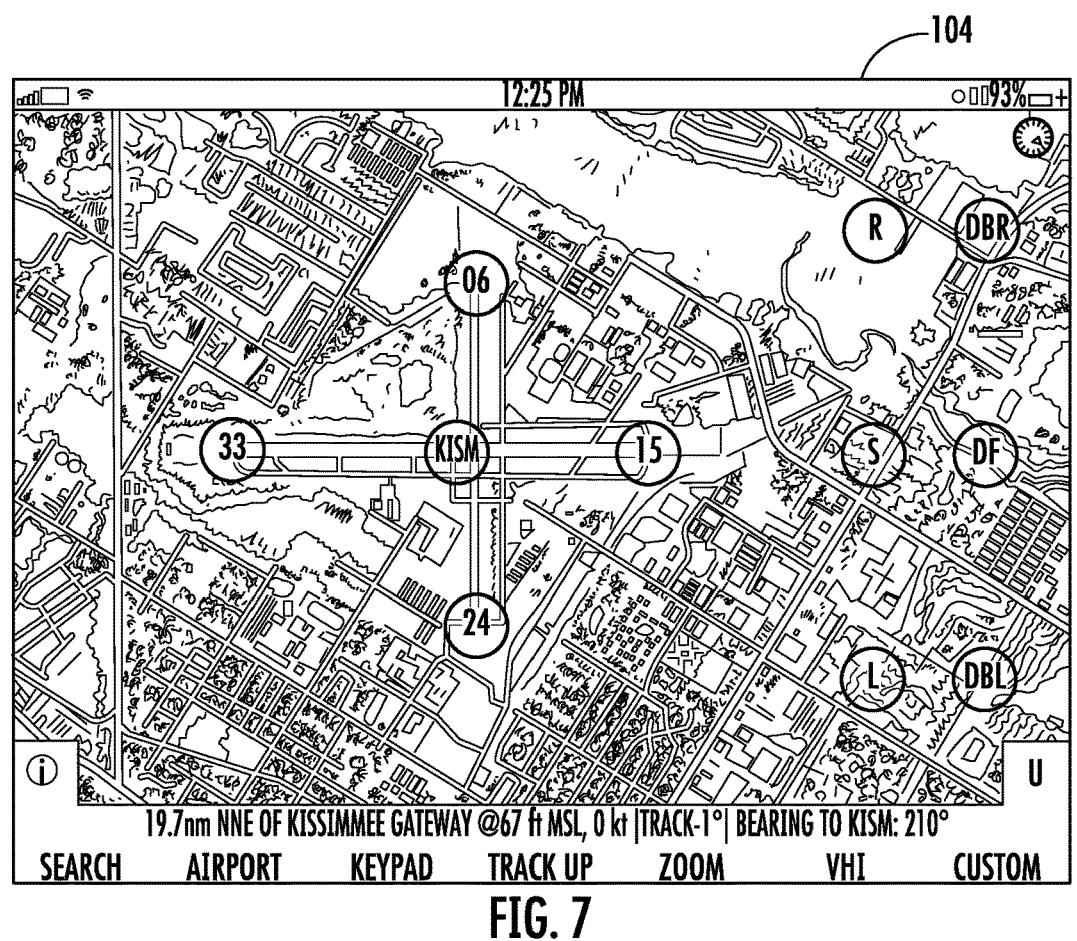
FIG. 7 is a screen view of an overhead graphical view of the system after user makes a section to an airfield.

The GUI system 100 is also configured to select and display an airfield pattern in a graphical view on the display screen. Referring to FIG. 7, after the user has selected an airfield, runways and possible approach patterns are displayed on the display screen. The possible approach patterns are shown as six additional buttons. Each button represents a different traffic pattern.

Figure 8:
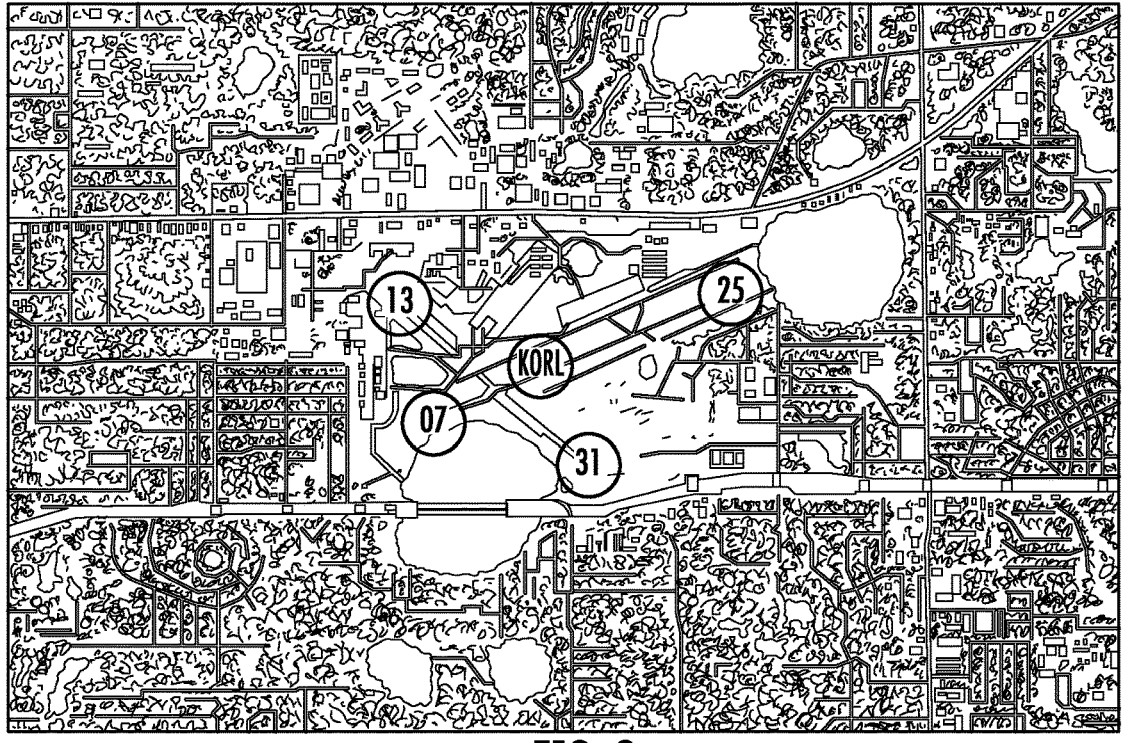
FIG. 8 is a screen view of a runway selection screen, according to an embodiment of the present invention.

Referring to FIG. 8, an aerial or satellite view of an airfield is superimposed on the display of an airfield indicator (KORL in FIG. 8) and indicators of each runway (07/25 and 13/31 in FIG. 8). For example, the indicators for the straight-in (S) and direct-to-final (DF) approaches are in the middle of their respective rows and aligned with the runway and runway indicator. For approaches with a base leg [i.e., downwind (R and L) and direct-to-base approaches (DBR and DBL)], the indicators are to the right or left of the central indicator (right and left being relative to the selected runway). Thus, the positions of the indicators correspond to the direction in which the base leg, when drawn, would extend away from the final leg.

Figure 9:
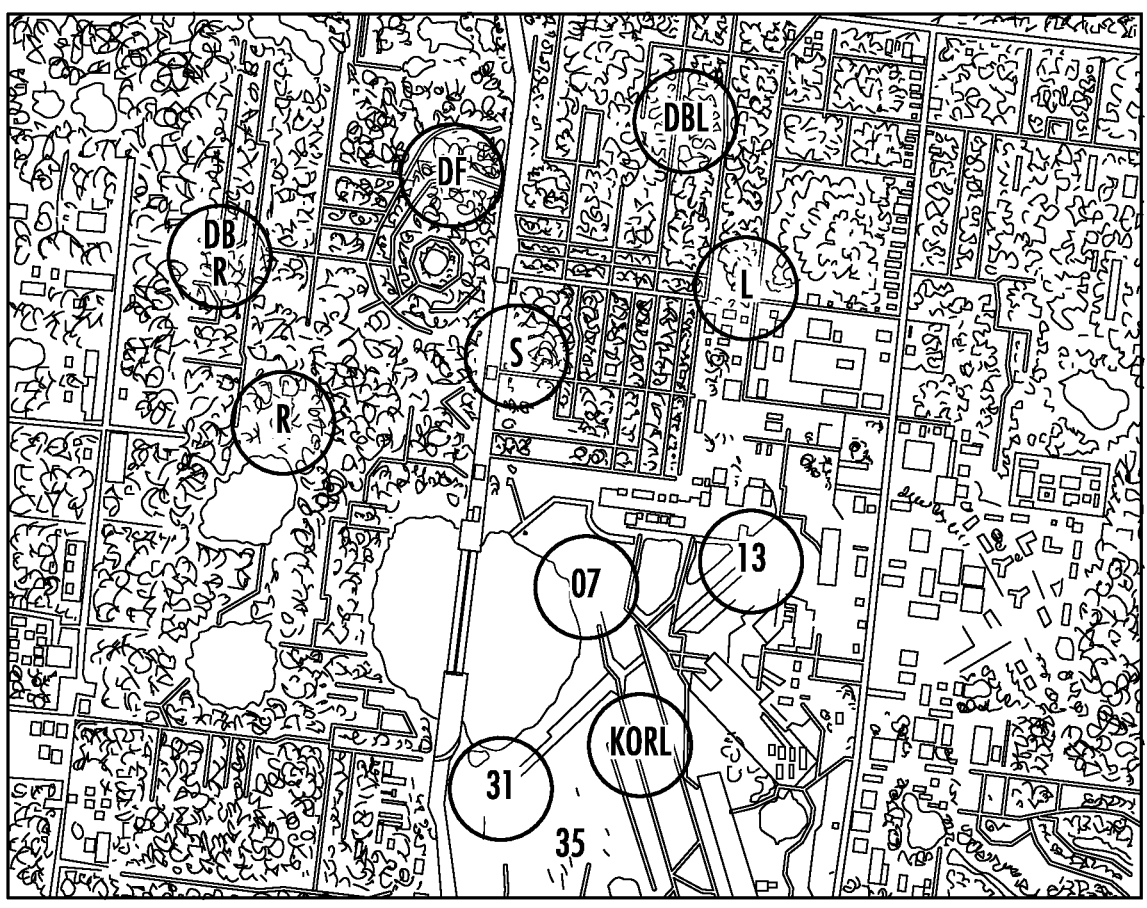
FIG. 9 is a screen view after runway selection, further displaying approach selection indicators.

The overall display orientation, once an airfield is selected, is preferably set to place the current bearing to the airfield from the aircraft at the top of the display. Alternate orientations can be selected (e.g., north at the top, aircraft heading at the top, etc.). To facilitate an intuitive runway selection, each runway indicator is located adjacent the beginning of image of the corresponding runway. Upon selecting the desired runway to approach, indicators for each approach type are then displayed for the selected runway, as shown in FIG. 9. Preferably, the indicators are arranged in two rows of three, the axis of each row being perpendicular to the selected runway and the rows and the middle indicators of each row being aligned with the runway (and selected runway indicator) in a location before the beginning of the runway.

Figures 10, 11:
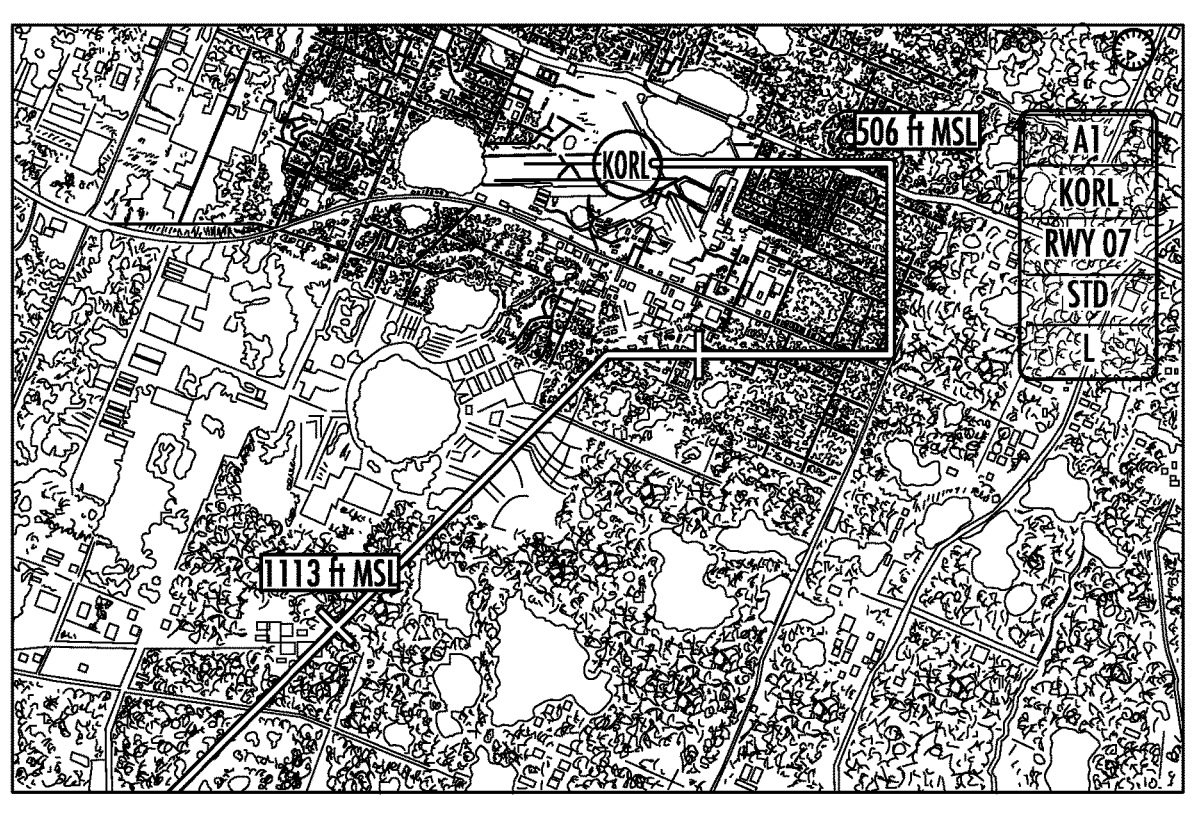
FIG. 10 is a screen view after approach selection, further displaying the select approach and applicable altitude gates.
FIG. 11 is a tabular view of system defaults used in connection with approach displays.

Referring to FIG. 10, once one of the several approaches is selected, the selected approach route is overlaid, to scale, on the display screen 104. Preferably, by reselecting the airfield indicator, the runway indicators are redisplayed to allow the user to select a different approach option. A status indicator is advantageously also displayed, allowing the user to see at a glance which airfield, runway and approach are selected. The "A1" and "STD" terms refer to standard approaches using predefined parameters in the system, which will be discussed in greater detail below.

Cross-hatches on the displayed approach route represent altitude gates, with corresponding altitudes, preferably automatically referenced to mean sea level, also displayed. In FIG. 11, the cross-hatch on the arrival leg (pattern altitude gate) represents the point at which the aircraft should have descended to pattern altitude, drawn at a predetermined distance before the entry point. The cross-hatch on the downwind leg (descent gate) represents the point at which the aircraft should begin descending to an altitude so as to intercept the proper glide path on final. The descent gate is drawn at a 90-degree angle from the beginning of the runway being approached. When the aircraft reaches final landing, a glide path intercept gate is advantageously also displayed on final prior to actual interception of the glide path altitude.

It will be appreciated that a VFR approach can be performed according to one of several prescribed patterns, with each VFR pattern having one or more legs with dimensional parameters relative to one or more reference points along the length of the runway being approached for landing. A common leg in any VFR approach is the leg aligned with the runway on which the aircraft makes its final descent to a landing (or aborted landing).

The user interface implemented by the system and method of the claimed invention allows a pattern corresponding to any VFR approach (including approach, arrival and landing segments) to be displayed with only two inputs required from the user—regardless of the runway or type of approach desired. Moreover, the arrangement of the selection indicators allows for a highly intuitive selection, in which the location of the indicators corresponds spatially to the desired pattern.

One manner in which the system and method allow for rapid selection of a wide variety of patterns is the use of "standard" pattern default values. Referring to FIG. 11, three sets of default values are shown (A1, A1.5 and A2). These settings are shortcuts for quick display of one of three common approach patterns associated with three categories of aircraft. Specifically, A1 is designed for low-performance piston aircraft, A1.5 for high-performance and multi-engine piston aircraft, and A2 for turbine- or jet-powered aircrafts.

As can be seen in FIG. 10, the A1 defaults were used to generate the displayed route. The user can preselect a set of default values to be used for the initial generation of approach routes for display and select different default values after a an initial route is drawn. While the depicted default values represent a pre-loaded preferred embodiment, the user can enter and save custom values.

Figures 12, 13:
FIG. 12 is a screen view including a keypad for altering aspects of the displayed approach.
FIG. 13 is a view of alternate keypad setups based on different circumstances.

In addition to permitting quick selections based on default values, the user input interface also facilitate deviations from the default values using a data entry keypad. Referring to FIG. 12, the keypad is advantageously implemented via the display and is automatically reconfigurable by the system. In FIG. 12, the keypad offers selections for a user to set a different pattern altitude, entry angle, and different lengths for the downwind and base legs. As can be seen, although the A1 defaults were selected, the user has used the keypad to enter a 2000-foot pattern altitude, which is automatically updated on the display. Since pattern altitudes are typically referenced to a distance above ground level (AGL), whereas the pilot is flying at an altitude above mean sea level (MSL), the keypad allows entry in AGL values and automatically converts to MSL for the display. It should be noted the default pattern can be varied based on the type of aircraft and other aircraft location and movement factors.

To further facilitate timely data entry, the keypad selections are preferably dynamically updated based on the current circumstances—as the types of default values a user is likely to want to change will vary based on factors like the type of approach selected and where the user is in the approach. Referring to FIG. 13, different keypad configurations suited to different circumstances are shown. The first keypad from the left will be displayed prior to entering the pattern where a downwind-to-base approach is selected. The second keypad will be displayed when the aircraft is on the downwind leg, allowing quick extension of the distance thereof. The third keypad will be displayed when one of the direct-to approaches (direct-to-base or direct-to-final) is selected, allowing quick customization of the report distance. The fourth keypad (last keypad on the right) can be displayed on the base leg, allowing the user to change the glide path angle for landing.

Figure 14:
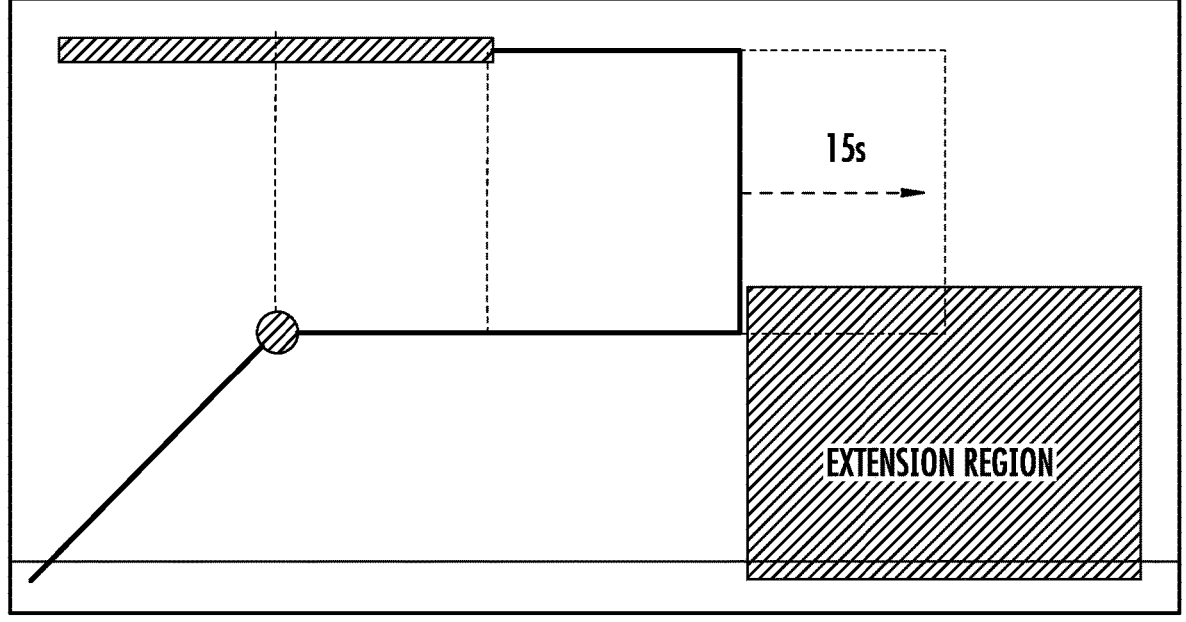
FIG. 14 is a schematic overview of an automatic downwind extension of a displayed approach.

The GUI system 100 allow for keypad adaptation for circumstances by monitoring the location of the aircraft and designating regions around the various portions of a designated approach. This also permits other automatic adaptations of the depicted approach. For example, referring to FIG. 14, when it is determined that an aircraft has not turned onto the base leg at the original end of the downwind leg, the downwind leg is automatically extended, with the remainder of the approach updated accordingly (i.e., the base leg is moved to the end of the new downwind leg and the final leg is lengthened commensurately). Preferably, the adjustment is made based on aircraft speed to give, for each automatic extension, another 15 seconds of flight before the new base leg is reached.

Figure 15:
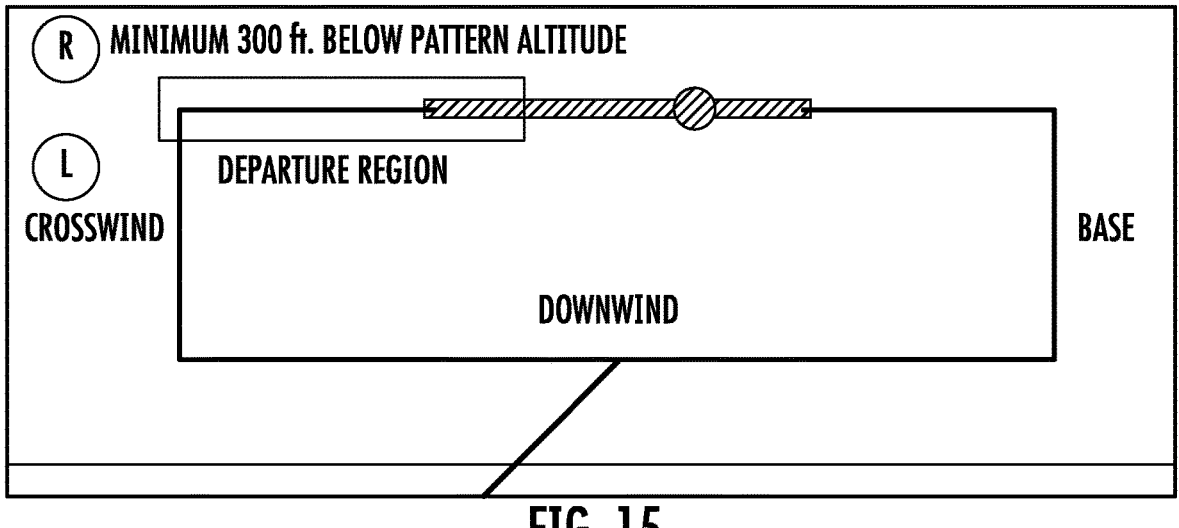
FIG. 15 is a schematic overview of an automatic display update attendant upon a go around or rejected landing.

Similarly, referring to FIG. 15, if an aircraft is detected entering a departure region (preferably at least 300 feet below pattern altitude), the depicted pattern is updated with the automatic display of a departure leg and a crosswind leg to return the aircraft to the downwind leg for another attempted landing. When a straight-in approach is selected, such that the downwind side of the runway is not previously designated, right and left (R and L) indicators can also be generated automatically, allowing the user to indicate quickly which side of the runway the go-around pattern should be generated.

Figure 16:
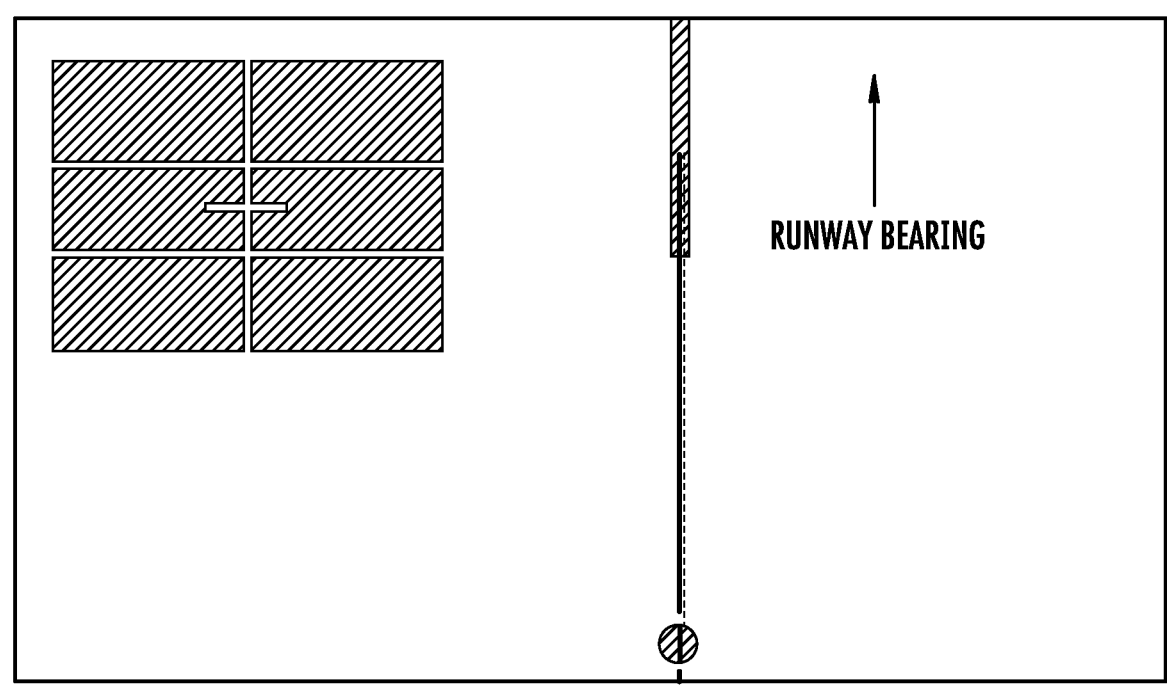
FIGS. 16-18 are schematic overviews of a glide path guidance indicator, under different aircraft conditions.
Figure 17:
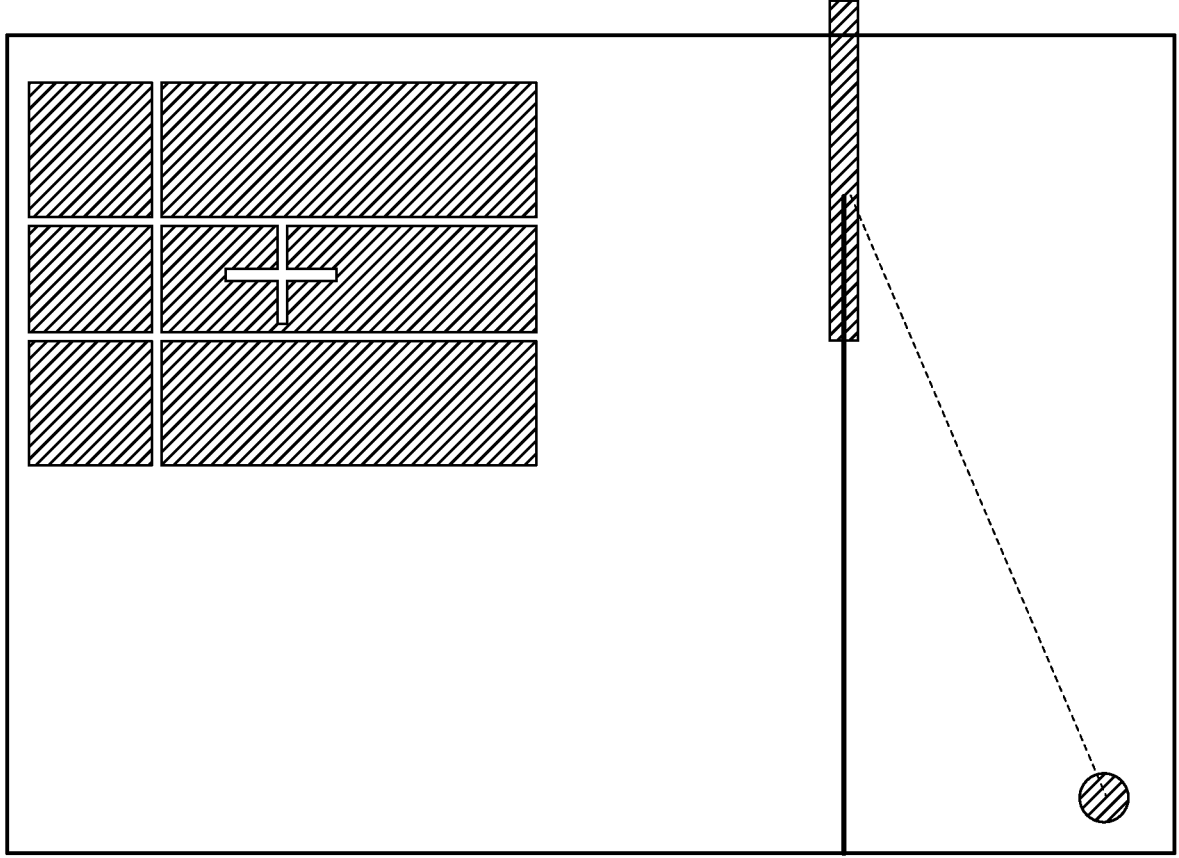
Figure 18:
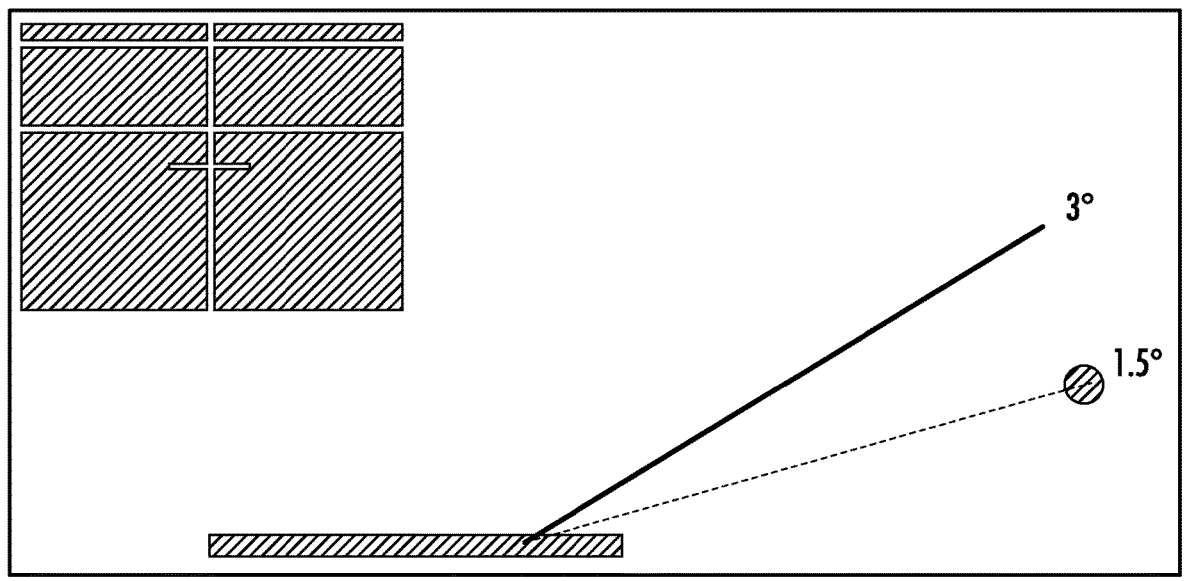

When an aircraft reaches the base leg (or predetermined distance out on direct-to-final and straight-in approaches), a region monitoring function will automatically trigger the display of a glide path guidance indicator. Referring to FIGS. 16-18, a guidance indicator visually indicates whether the aircraft is above or below the glide path. In FIG. 18, the crosshair is centered on the vertical centerline, meaning the aircraft is horizontally on the glide path, and also centered between the two horizontal lines, meaning the aircraft is vertically on the glide path. In FIG. 17, the guidance indicator shows the aircraft vertically on the glide path, but horizontally to the right of the glide path. In FIG. 18, the guidance indicator shows the aircraft horizontally on the glide path but vertically below it. A manual change of glide path will automatically change the display to the new glide path.

In a straight-in approach, an aircraft simply approaches along the bearing of the runway from some predetermined distance away from the runway, beginning its descent at an appropriate point along that long leg. Often, in part to allow better visualization of traffic conditions prior to landing, a VFR approach begins with the aircraft entering—a predetermined entry point—a downwind leg parallel with the runway and final leg, passing the end of the of the runway on the downwind leg by a predetermined distance and turning 90 degrees onto a base leg perpendicular with the downwind leg. The base leg terminates at its intersection with the final leg, with the aircraft turning another 90 degrees onto the final leg and descending for a landing. Other VFR approaches include direct-to-final and direct-to-base, with the aircraft entering the pattern by turning onto final and base legs, respectively, at a predetermined report distance from the respective end thereof.

Preferred parameters of approaches are set by official guidelines. Therefore, a theoretical possibility is to plot and follow an approach using conventional computer-based means—for example, plotting GPS waypoints at each turn. However, this type of user interface will be impractical and largely useless in a real-world situation. For instance, the location and direction of downwind and base legs relative to the runway will vary with wind direction, which may not be known with certainty until the aircraft is already in the vicinity of the airfield. Additionally, even the simplest single airstrip landing site features two runways (i.e., on reciprocal headings of the landing strip), while many airfields feature multiple, often intersecting strips. The active runway will again vary with many factors, and these might not be known sufficiently far in advance to allow a user to plot all the necessary points. Moreover, the three-dimensional aspects of an approach (i.e., required changes in altitude) could not readily be facilitated using such means.

In addition to the inherent variability of standard VFR patterns, local requirements and exigent circumstances may require deviations from the standard patterns. For example, after an aborted landing, the aircraft will need to be piloted through departure and crosswind legs before returning to the downwind leg to re-attempt the landing. As another example, in the presence of traffic in the pattern, it may be necessary for the downwind leg to be extended. Simply steering back to a previously plotted waypoint could be disastrous in these circumstances.

Figure 19:
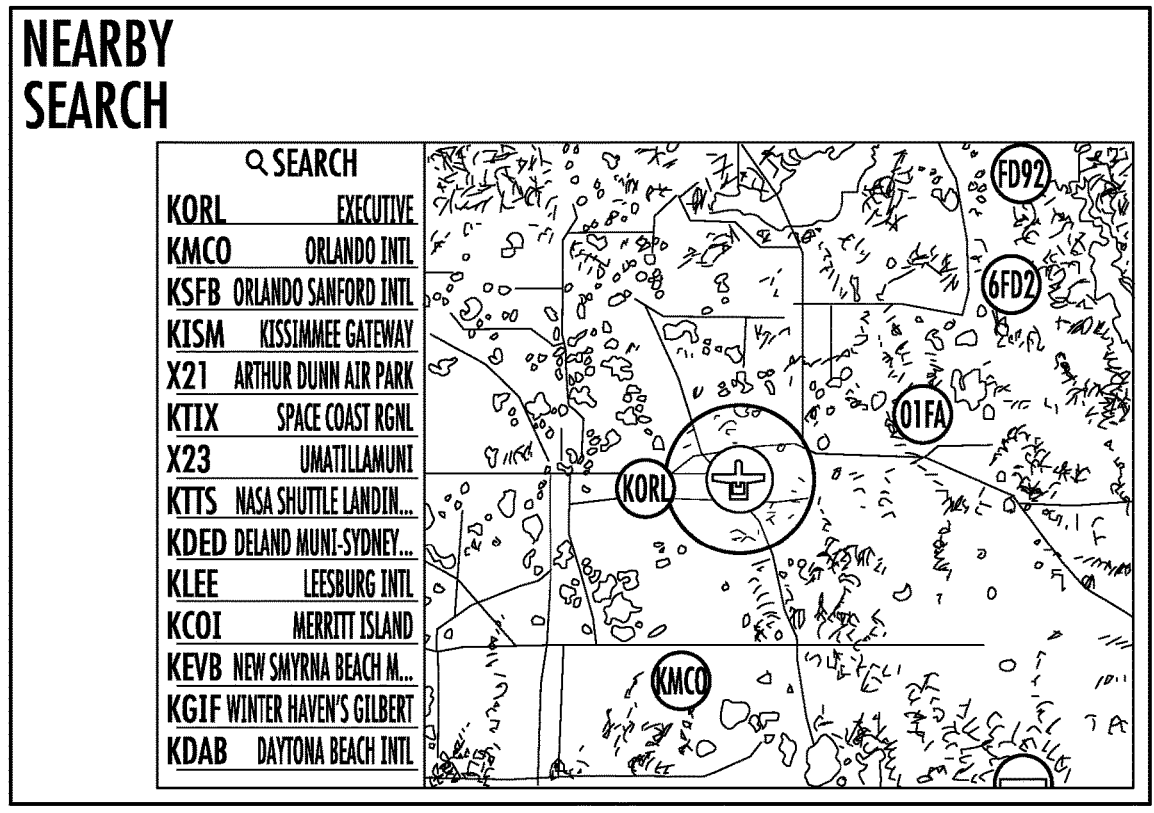
FIG. 19 is a screen view of an airfield search/selection screen.

The system and method of the present invention offer various methods for airfield selection. For example, referring to FIG. 19 all airfields within a predetermined or selected vicinity of the aircraft can be displayed, both in list form and as selection indicators on a map or chart. This display will preferably be updated periodically in response to aircraft movement. Advantageously, different colored indicators can be used to distinguish between different types of airfields (e.g., public, private, military, helicopter, sea plane base). The user can preferably pan and zoom the map or chart to display more, fewer, or different airfields. Upon selecting a desired airfield from the map or list, a view like FIG. 8 is displayed for the selected airfield.

Alternately, a text entry search for airfields could be performed based on various criteria (e.g., city and state, airfield designator, and airfield name). The search can advantageously filter results based on characters entered. For example, if the search text includes a comma, the results can be filtered based on city and state (if at least two terms separated by a comma) or city (if only one term). If the search text does not include a comma, and no characters are entered, then the most recent set of nearby airfields is indicated. If one to two characters are entered, then results are filtered by state. If three to four characters are entered, then the results can be filtered by airfield designator, and if more than four characters are entered the results can be filtered by airfield name and/or city. This type of search interface leverages unique aspects of airfield data to allow a database to be more effectively filtered and yield relevant results more quickly.

Additionally, the system can automatically select the nearest airfield suitable for landing. This is particularly advantageous in an emergency landing situation. The nearest airfield selection can take into consideration airfield suitability criteria, including operator-specified criteria and/or criteria derived based on aircraft type.

For any selected airfield, the present invention can immediately calculate all of the necessary information to generate the above-described interface, simply from having at least one three-dimensional coordinate and defined length vector(s) therefrom for each landing strip [e.g., a latitude, longitude and altitude relative to MSL, and a length and bearing (and, if applicable, altitude change) of the runway therefrom]. A user can also manually enter such information for an airfield, if not already in a database accessible by the system/method, at which point all of the above functionality is immediately available for the newly-defined airfield. For example, for a processing unit in signal communication with the database and the display screen, the processing unit can be configured to receive aircraft location and movement information and determine the displayed content and format of the content based on the user input, aircraft location and movement information, and associated airfields information retrieved from the database.

Figure 20:
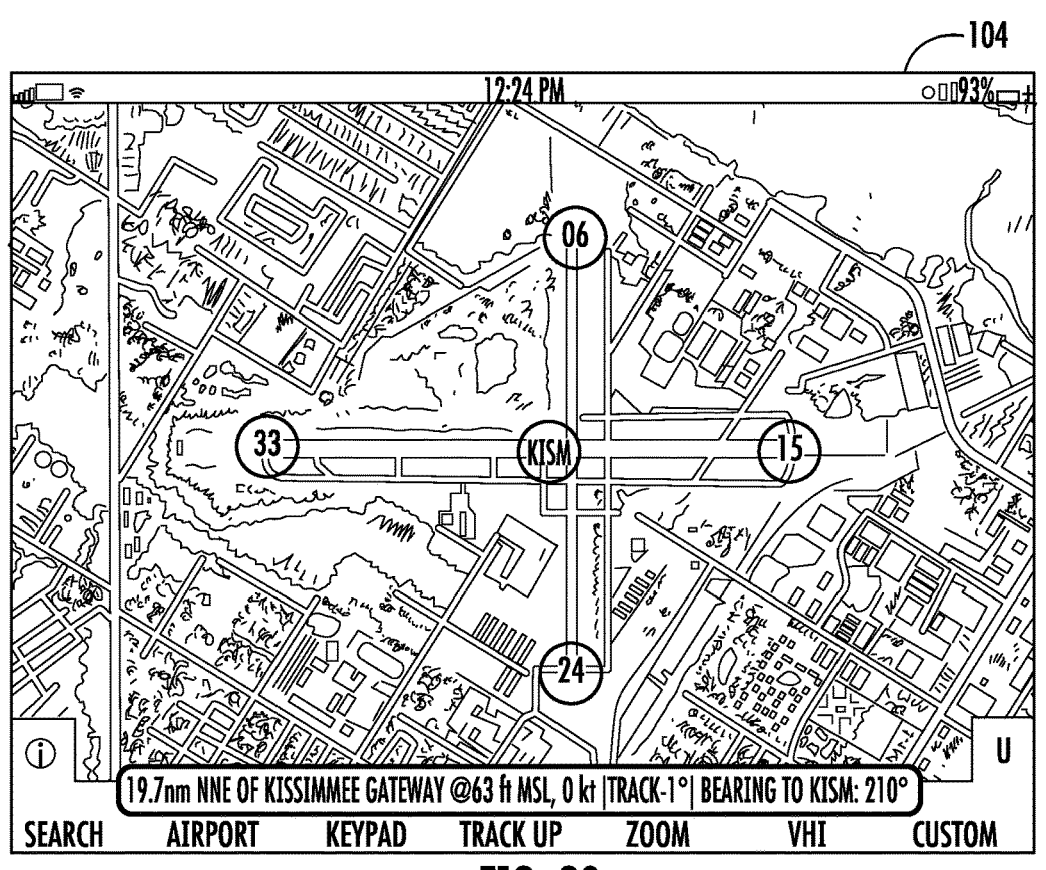
FIG. 20 is a screen view after approach selection, incorporating communications facilitation features.

Referring to FIG. 20, the system and method of the present invention can further advantageously include consistent updating of relevant communications information and display of this information in a readable format. As the aircraft proceeds through the approach, the displayed information and, as applicable, format will be updated automatically. For non-standard approaches, more general information can still be provided, such as range and bearing to the airfield, along with altitude and speed.

Figure 21:
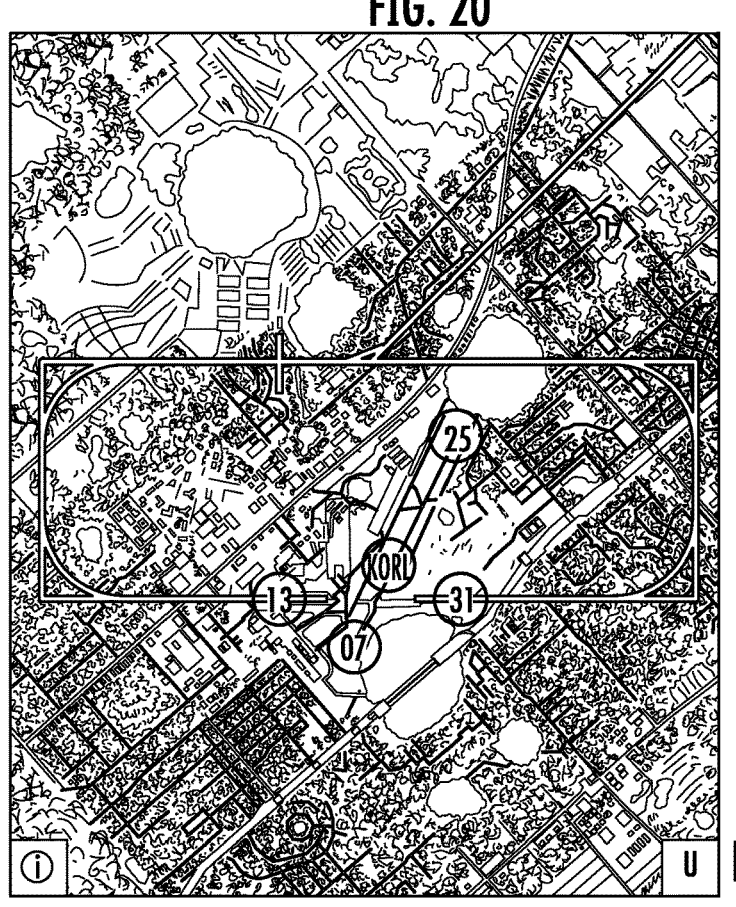
FIG. 21 is a screen view showing turning radius of a selected approach pattern.

Referring to FIG. 21, the system and method of the present invention are configured to calculate and draw an arc wherever the plane may perform a banked turn, such as on entry to the arrival leg, downwind leg, base, final, departure, crosswind, and the like. For example, the arcs in FIG. 21 were calculated for the performance characteristics of an aircraft traveling at 70-90 knots and 16-25 degrees of bank at one mile and 3-6 degrees per second turn rate. The turn radius increases with the size of the pattern to support larger and faster planes. The ratio for arcs within a pattern equates to ¼ of the length of base to support level flight on base and crosswind. The arcs can be calculated and drawn dynamically based on a combination of velocity, bank angle, rate of turn, and turn radius. As an example, turn radius is calculated as $velocity^2/(11.26*tan(bank\ angle))$ and rate of turn equals to $1091*tan(bank\ angle)/velocity$ in knots.

Figures 22, 23:
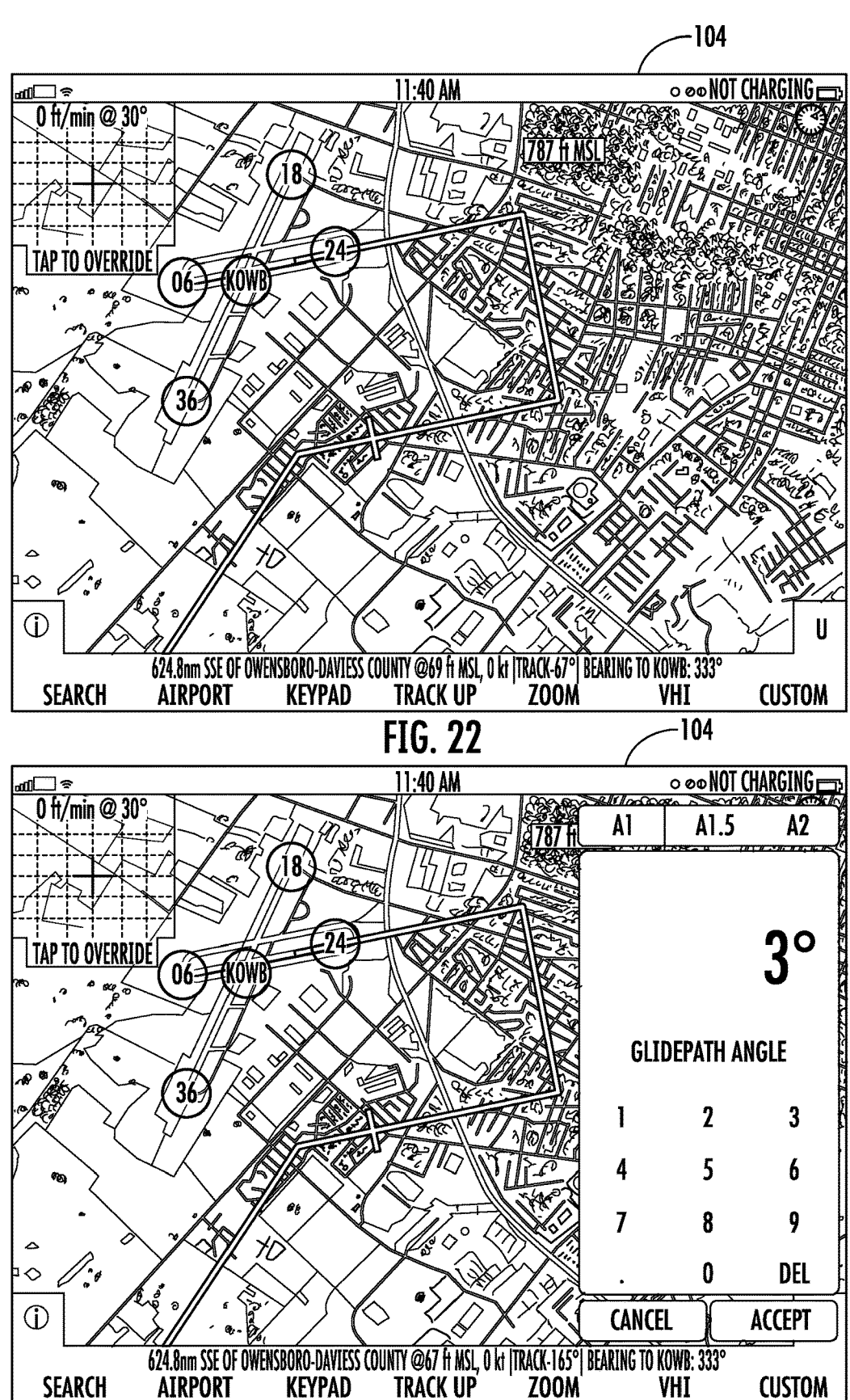
FIGS. 22-25 are screen views of an overhead graphical view including a vertical horizontal indicator (VHI) indicator and associated keypads, according to another embodiment of the present invention.
Figures 24, 25:
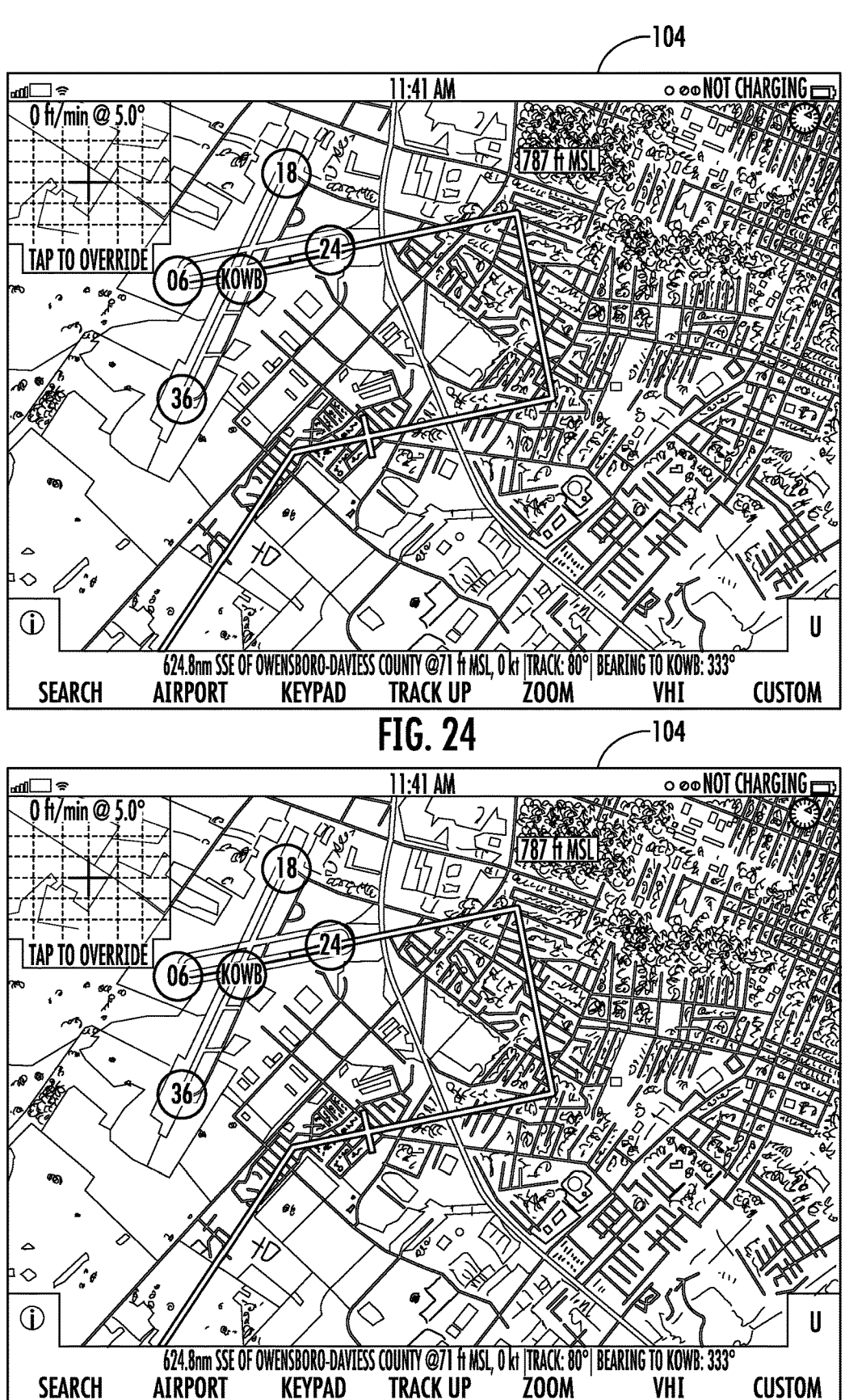

Referring to FIG. 22, the display screen 104 of the present invention can further display a vertical-horizontal indicator (VHI) or glide path indicator in the upper left corner of the display screen to allow a user to fly a constant heading and slope onto the selected runway. The VHI shows the slope and the corresponding rate of descent (ROD) an aircraft should follow. The VHI allows a user to fly a constant slope onto the selected runway through moving vertical and horizontal bars (see white bars at the upper and left-hand sides of the VHI). Tapping the VHI allows a pilot to change the slope value. For example, referring to FIG. 23, tapping the VHI will cause a keypad to appear automatically. The user can change the slope value. Referring to FIG. 24, the new slope value is confirmed in the VHI on the upper left corner of the display screen.

The system has the ability to input information to define a specified area as landing runway and generate a suitable approach pattern associated with the custom created runway. For example, referring to FIG. 25, a private runway is shown but the airfield has no published approach patterns. A user can create a suitable approach pattern using the user interface of the system. Specifically, when a user taps a "Custom" button, the system will display a manual entry box on the screen to allow the user to create a suitable approach pattern to the private runway. Specifically, the system will compute an upwind leg, a crosswind leg, a downwind leg, a base leg, and final approach based on the aircraft location and runway location. The system can compute one or more approach patterns suitable for any landing area.

Figures 26, 27:
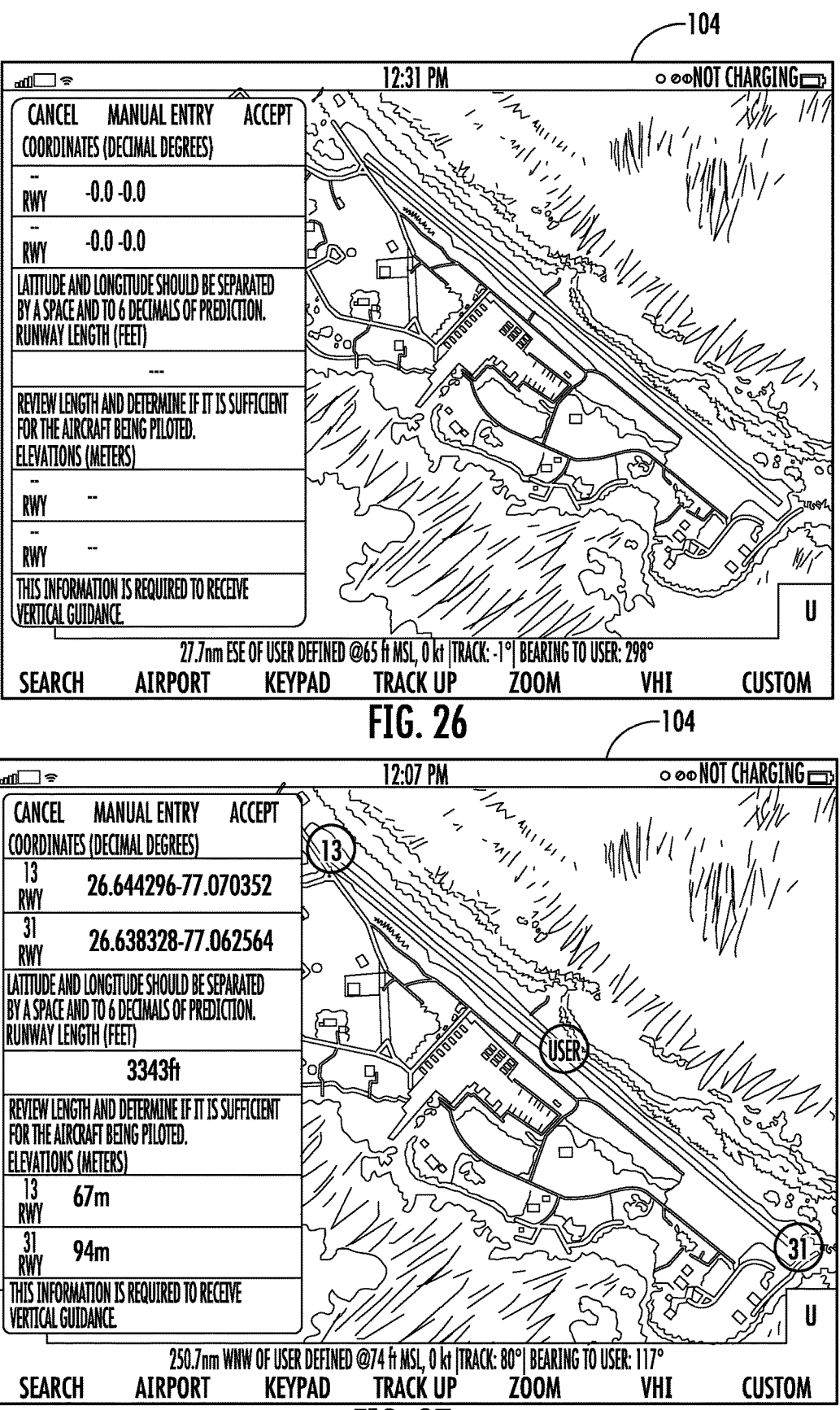
FIGS. 26-27 illustrate a screen view of a landing site creation for a selected runway.

Referring to FIG. 26, as an example, a user taps at both ends of a selected runway or enters the latitude and longitude for both ends of the runway. The system can automatically confirm the creation of the landing site by naming it "user"

and assign numbers to the runway, for example, runway 13-31, as shown in FIG. 27. The system is configured to give a user the length of the defined runway, for example, 3343 ft, and the field elevation (MSL) at each end, for example, 67 m and 94 m, as shown in the figure. By comparing both ends, the user can determine that runway 13 will be an uphill landing and runway 31 will be a downhill takeoff. Once the user taps "Accept", the system will create one or more approach patterns for each runway automatically.

Similarly, referring to FIG. 28, a user can define a landing site for a seaplane by tapping at both ends of a desired lane or region. The system automatically confirms the creation of the lane by naming it "User" and assigning numbers to the defined lane, for example, lane 10-28. The system provides the length of the lane created: 10,462 feet and the elevation (MSL) at each end. Once the user taps "Accept", the system will create all the approaches for each lane automatically.

Figure 30:
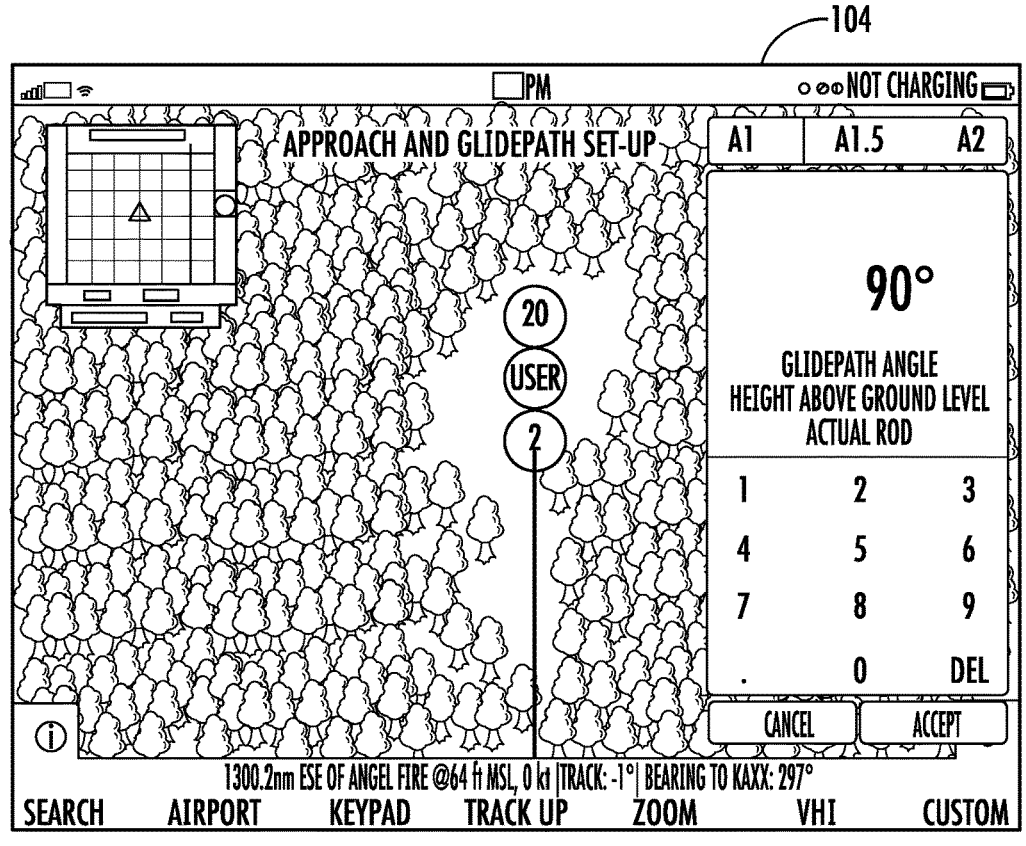
Figure 31:
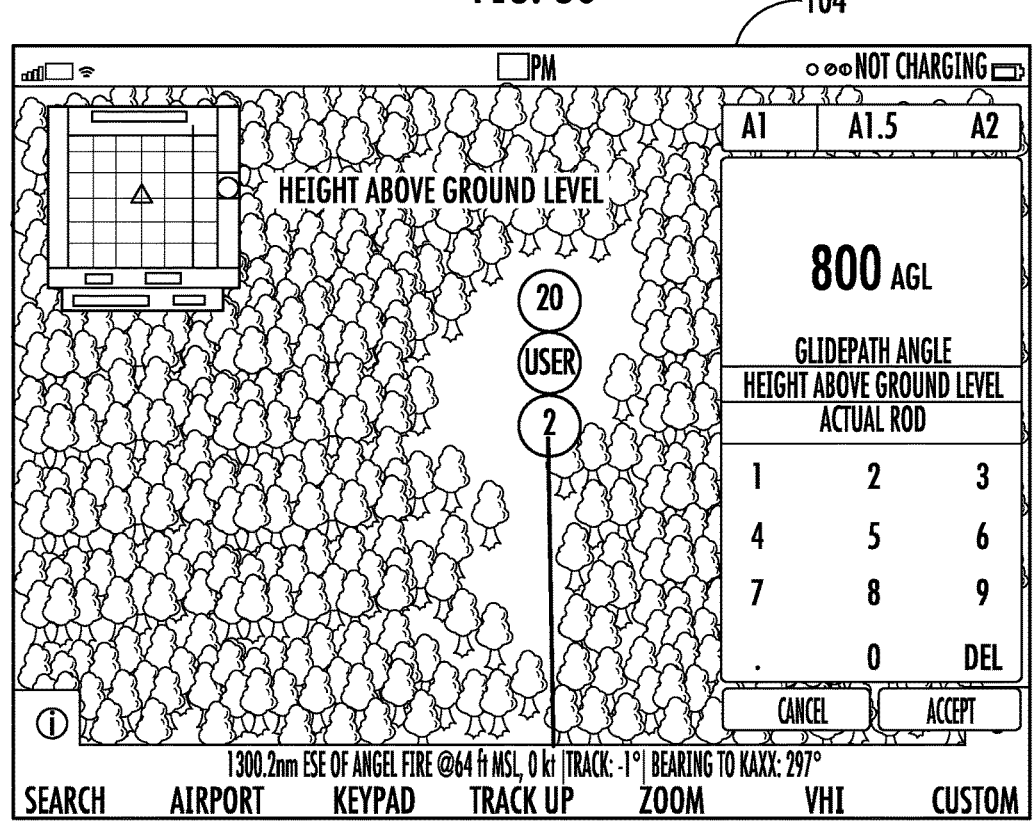
Figure 32:
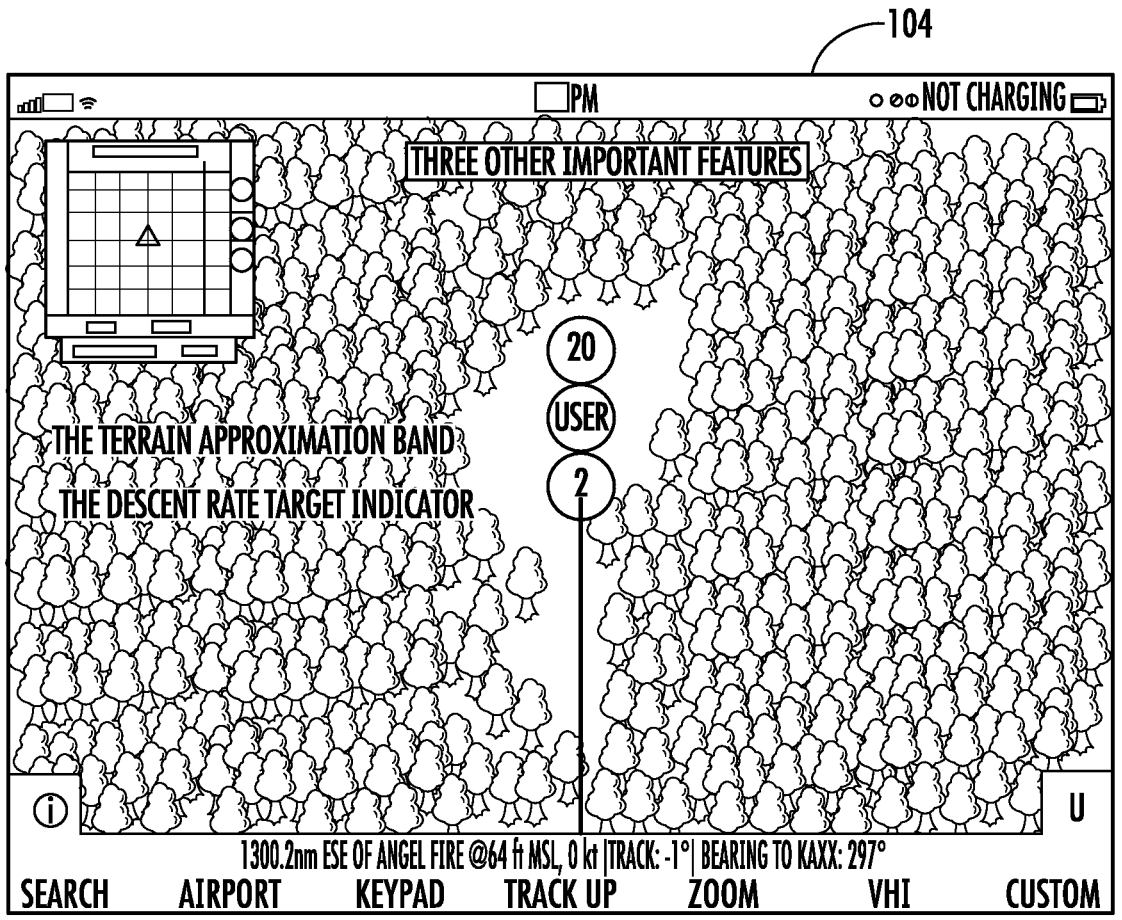

Referring to FIG. 29, a user can also define a landing site and associated landing path for a helicopter. For example, a user can select approach type "90" and "above ground level" (AGI) input keypad appears on the display screen. Referring to FIG. 30, a user inputs "800" feet as AGI. Then a ROD window appears on the display screen and shows "100 ft/min" (FIG. 31). Then a descent rate target indicator is shown on the upper left corner of the display screen, indicating current descent rate in relation to the target descent rate and a terrain approximation band is drawn along descent path (FIG. 32).

Referring to FIGS. 33-45, the display screen can be configured to display a split view of a HUD on the left side and an overhead graphical view on the right side of an airfield to be approached. FIGS. 33-45 are for example only. Other split view arrangements can be used. For example, the HUD view can be on the right side and the overhead graphical view on the left side of the display screen. Or the split view can be split vertically instead of horizontally. For example, the HUD can be on the top of the display screen, and the overhead graphical view on the bottom of the screen. The HUD can also be overlaid on top of the overhead graphical view, just as the overhead graphical view can be overlaid on top of the HUD. Alternatively, the views can be displayed on two separate devices.

The HUD visually indicates the aircraft's position in relation to a planned path (e.g., above, below, to the left, to the right). The aircraft in HUD is indicated by the crosshairs. In the depicted embodiment, the HUD integrates a moving square guidance box in relation to an aircraft. The moving guidance box indicates a real time aircraft position in relation to a planned approach and landing path. When an aircraft is centered between two vertical lines of the square guidance box, it means the aircraft is horizontally located on the approach and/or landing path. When an aircraft is centered between the two horizontal lines of the square guidance box, it means the aircraft is vertically located on the approach and/or landing path.

The overhead graphical view on the right side of the display screen is an aerial or satellite view of an airfield. Other overhead graphical views can be employed, such as standard aviation charts, and airfield information diagrams. In the depicted embodiment, the overhead graphical view on the right side of the display screen includes a selected approach pattern of an airfield (e.g., airfield KORL).

Two square check boxes are shown on the overhead graphical view. These two check boxes are configured to be superimposed automatically on two adjacent crucial points (e.g., turning point, altitude gate) on an approach pattern. Specifically, the crucial points include an altitude gate on an arrival leg, a downwind leg, a base leg, and one or more turning points there between. An altitude gate represents the point at which the aircraft should have descended to a specific altitude, and it is usually drawn at a predetermined distance before an entry point. A descent gate represents a point at which the aircraft should begin descending to an altitude so as to intercept the proper glide path on the final approach. The descent gate is usually drawn at a 90-degree angle to the beginning of a runway being approached. When an aircraft reaches the final approach, a glide path intercept gate is advantageously also displayed prior to actual interception of a glide path altitude.

Figure 33:
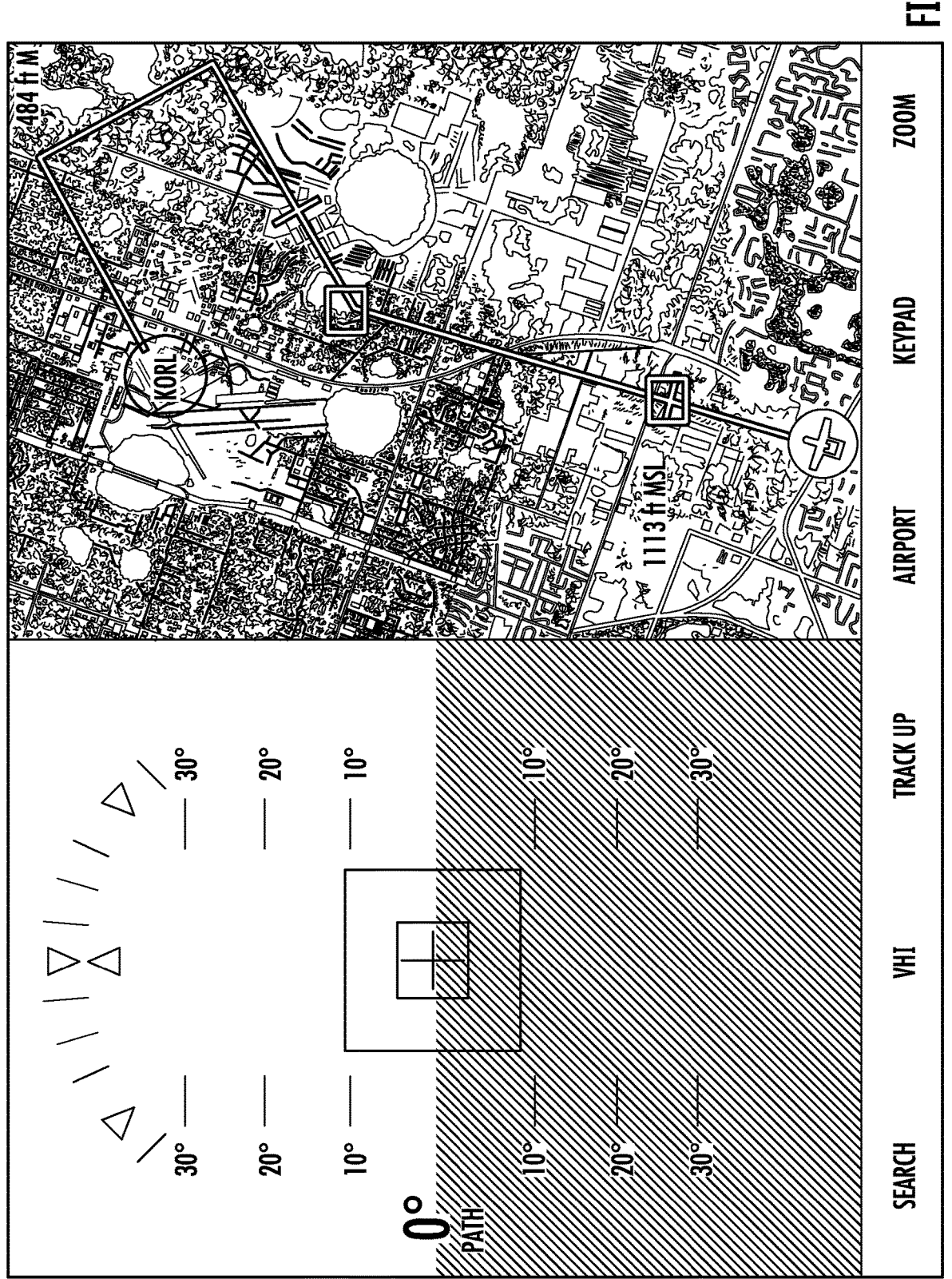
FIGS. 33-46 are split screen views of a head-up display on the left side and a corresponding overhead graphical view on the right side.
Figure 34:
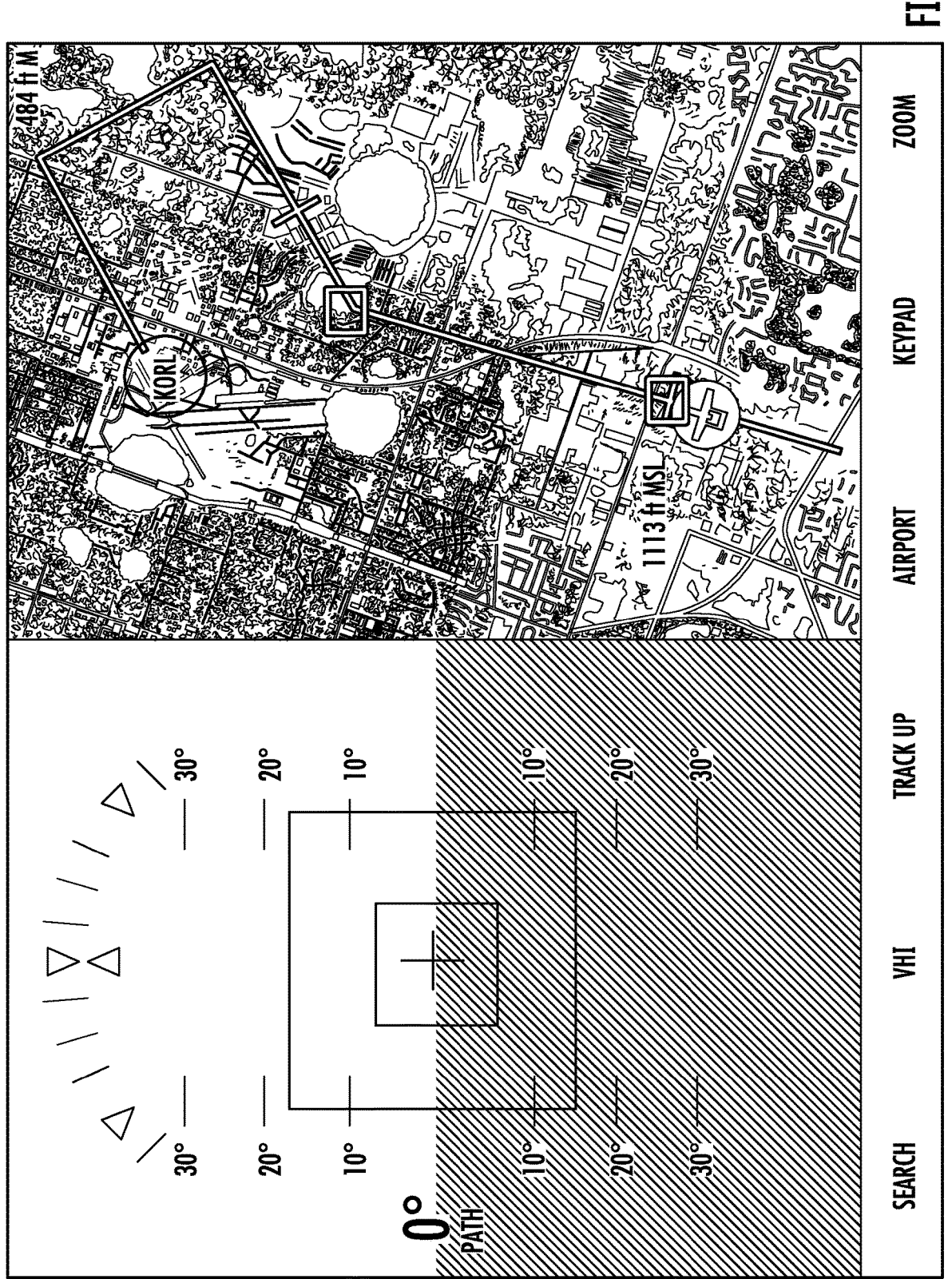

Referring to FIGS. 33-34, as the aircraft is flying on the approach leg, the two check boxes on the overhead graphical view are an altitude gate on the approach leg and a turning point between the approach leg and the downwind leg. At the moment captured in these figures, the corresponding guidance box is located on the center of the HUD display, and the aircraft fits in the center of the guidance box, which indicates that the aircraft is on the planned approach path.

Figure 35:
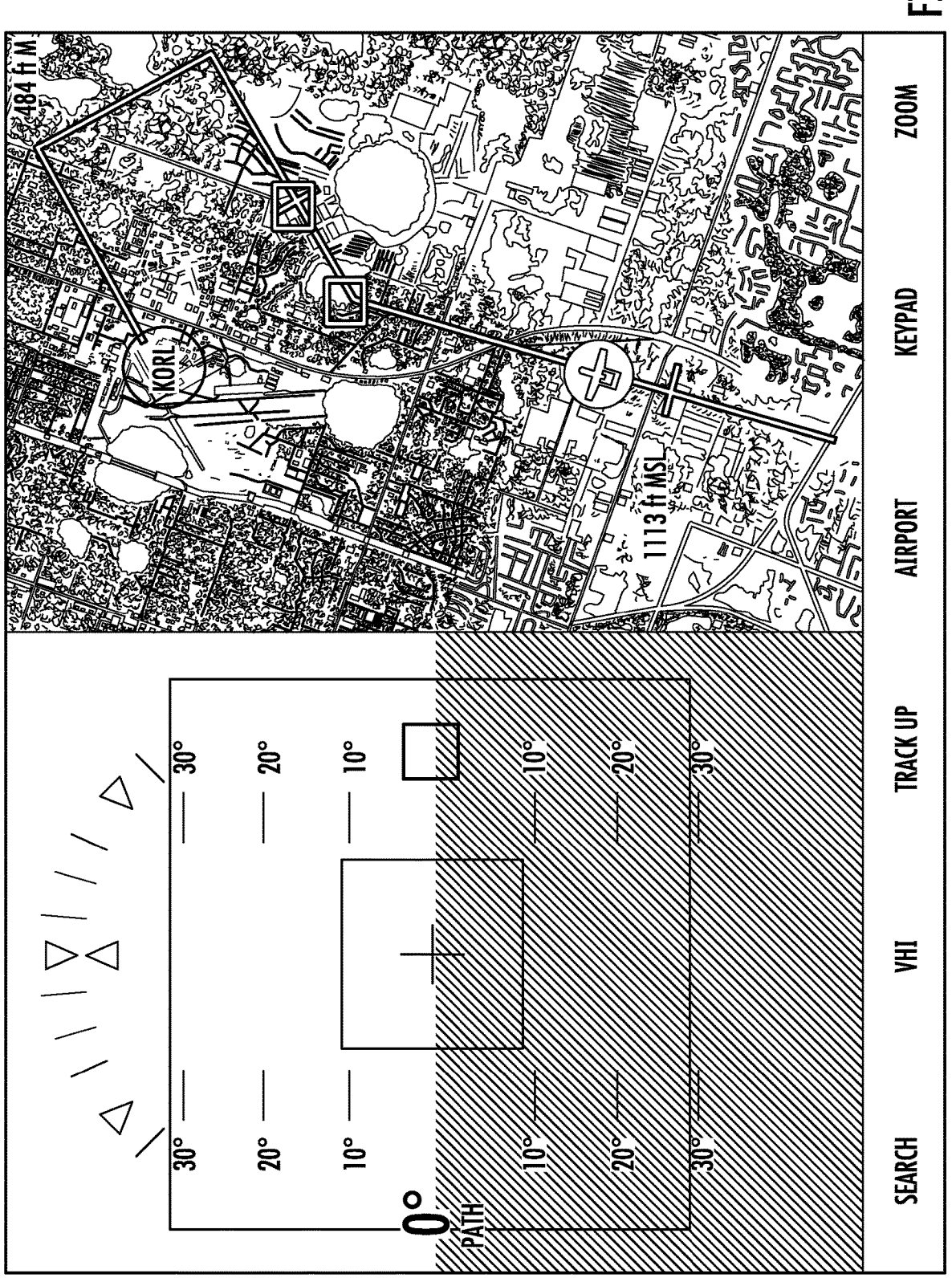
Figure 36:
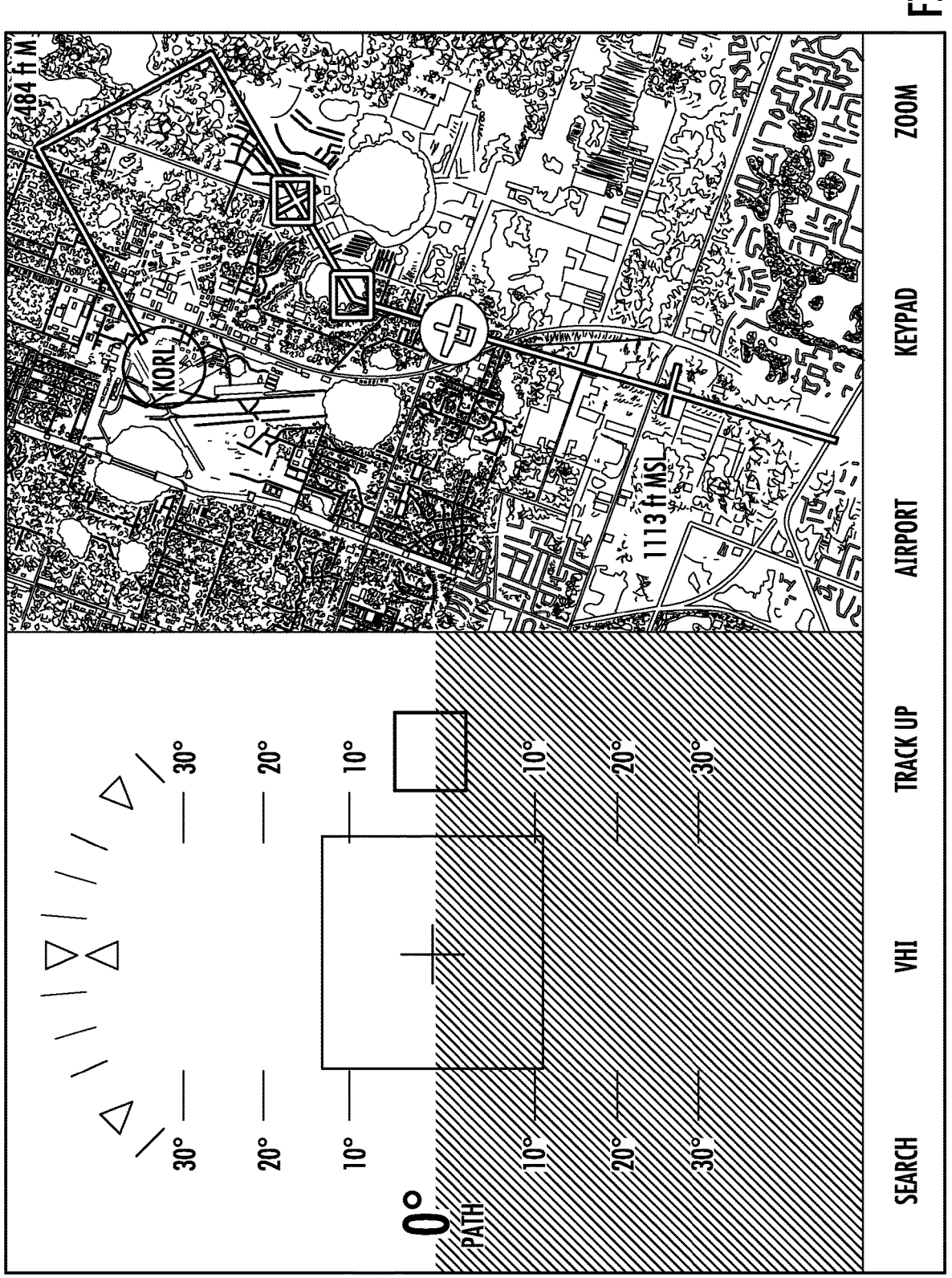

Referring to FIGS. 35-36, as the aircraft flies through the altitude gate on an approach leg, the two check boxes on the overhead graphical view are the turning point between the approach leg and the downwind leg and an altitude gate on the downwind leg. At the moment captured in these figures, HUD shows the guidance box on the right side of the aircraft. A pilot needs to turn right to follow a planned approach and landing path.

Figure 37:
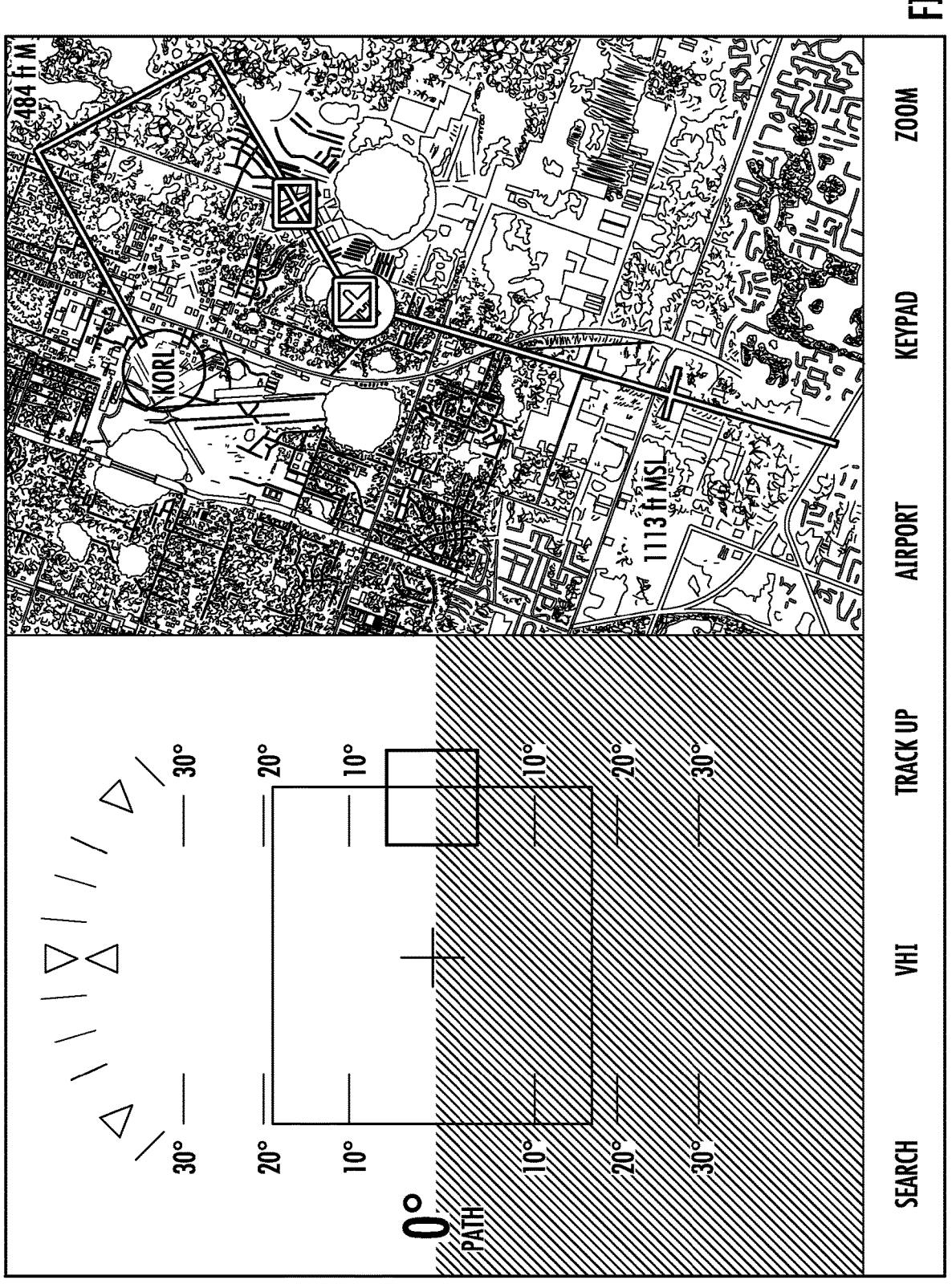

Referring to FIG. 37, as the aircraft passes through the turning point between the approach leg and the downwind leg, HUD shows the guidance box still on the right side of the aircraft, but closer to the center than in FIGS. 35 and 36. This means a pilot still needs to make a minor right turn to follow the planned approach and landing path.

Figure 38:
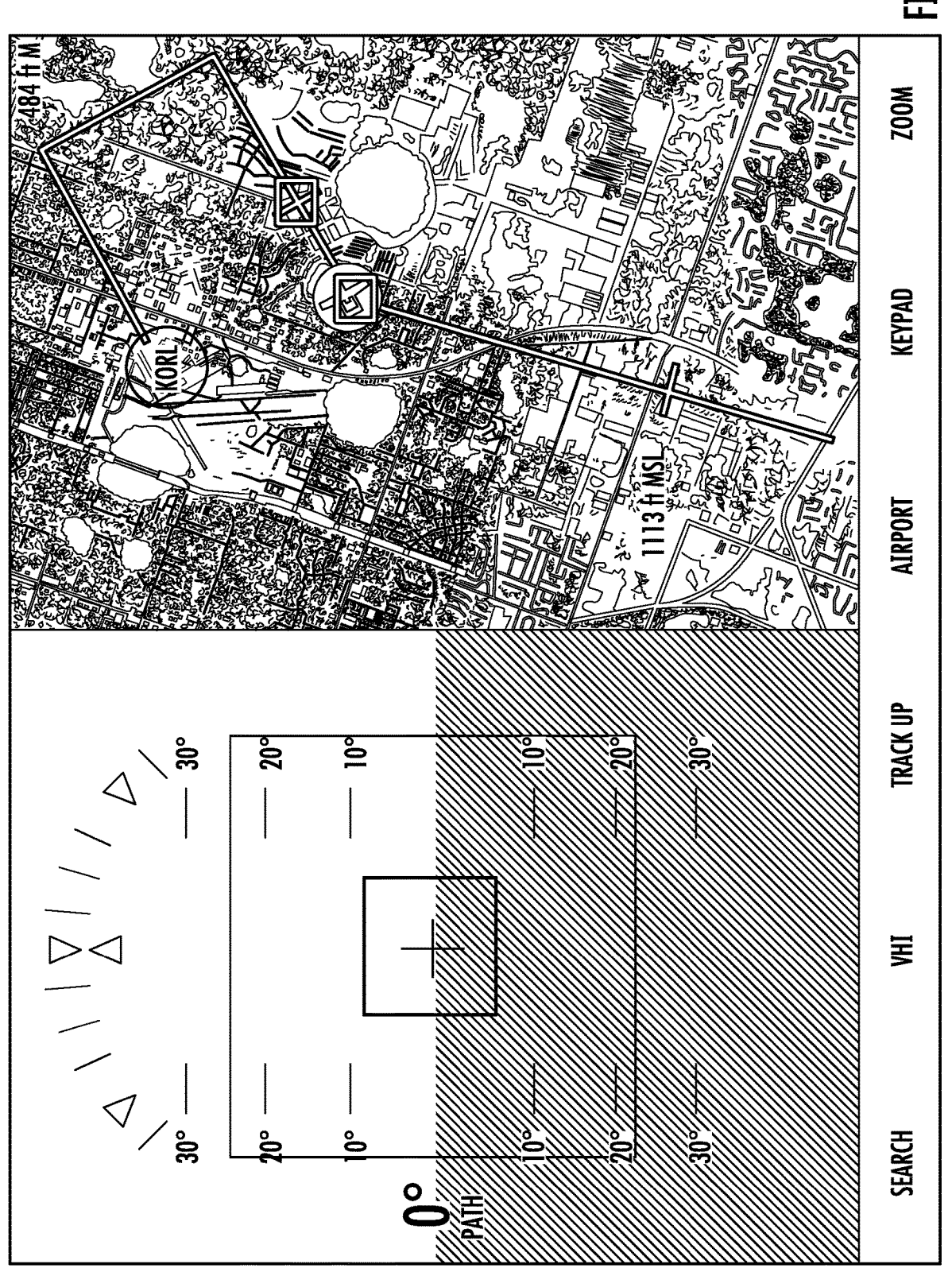

Referring to FIG. 38, when the aircraft passes through the turning point between the approach leg and the downwind leg, HUD shows the aircraft positioned in the center of the guidance box, meaning the aircraft is right on the approach and landing path.

Figure 39:
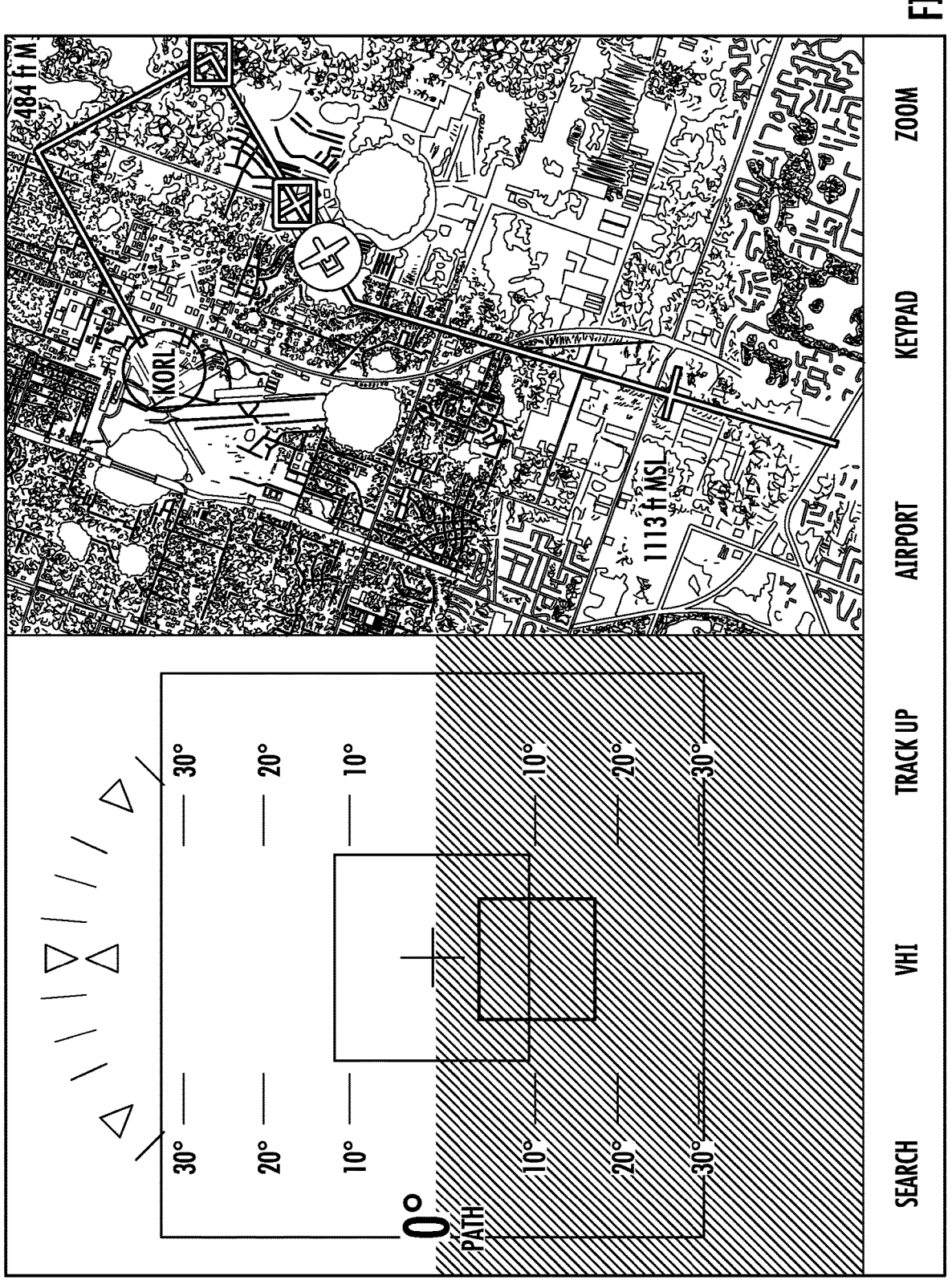

Referring to FIG. 39, the aircraft has passed through a turning point between the approach leg and downwind leg and is on the downwind leg. At the moment captured in this figure, the two check boxes on the overhead graphical view are an altitude gate on a downwind leg and a turning point between the downwind leg and a base leg. HUD shows the aircraft on the top of the square guidance box but centered between the two vertical lines of the square guidance box. This means the aircraft is above the calculated altitude on the planned descent course. A pilot will need to decrease the aircraft altitude to fit the aircraft symbol to the square guidance box.

Figure 40:
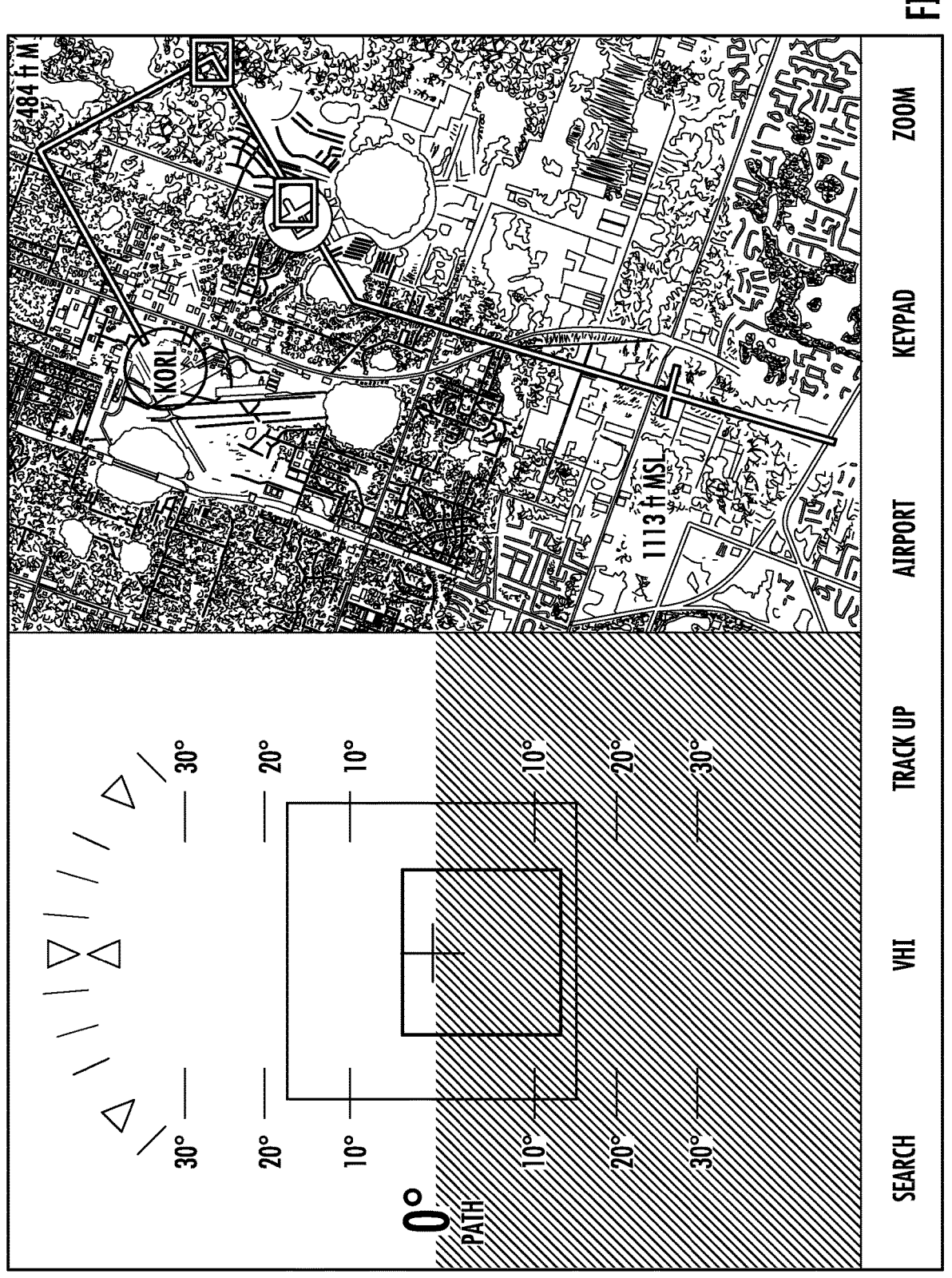

Referring to FIG. 40, the aircraft is flying through an altitude gate on the downwind leg. HUD shows the aircraft still slightly above the calculated altitude on the descent course. The pilot will still need to decrease the aircraft altitude to fit the aircraft symbol to the center of the square guidance box in HUD.

Figure 41:
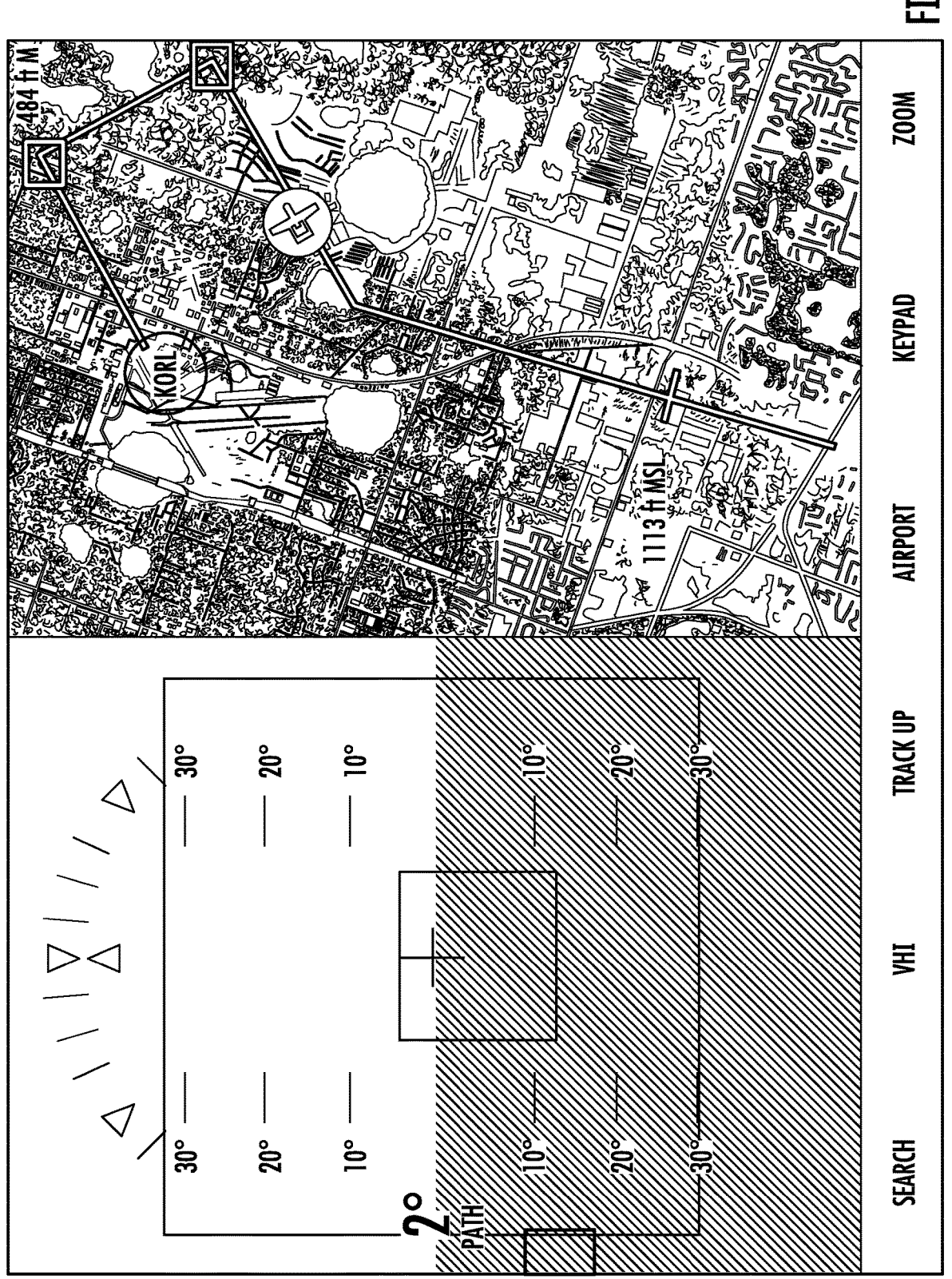

Referring to FIG. 41, the aircraft has flown through the altitude gate on the downwind leg. At the moment captured in this figure, the two check boxes on the overhead graphical view are a turning point between the downwind leg and the base leg and a turning point between the base leg and final leg. HUD shows the square guidance box on the left side of the aircraft. This indicates the pilot will need to turn the aircraft to the left to follow the planned approach and landing path.

Figure 42:
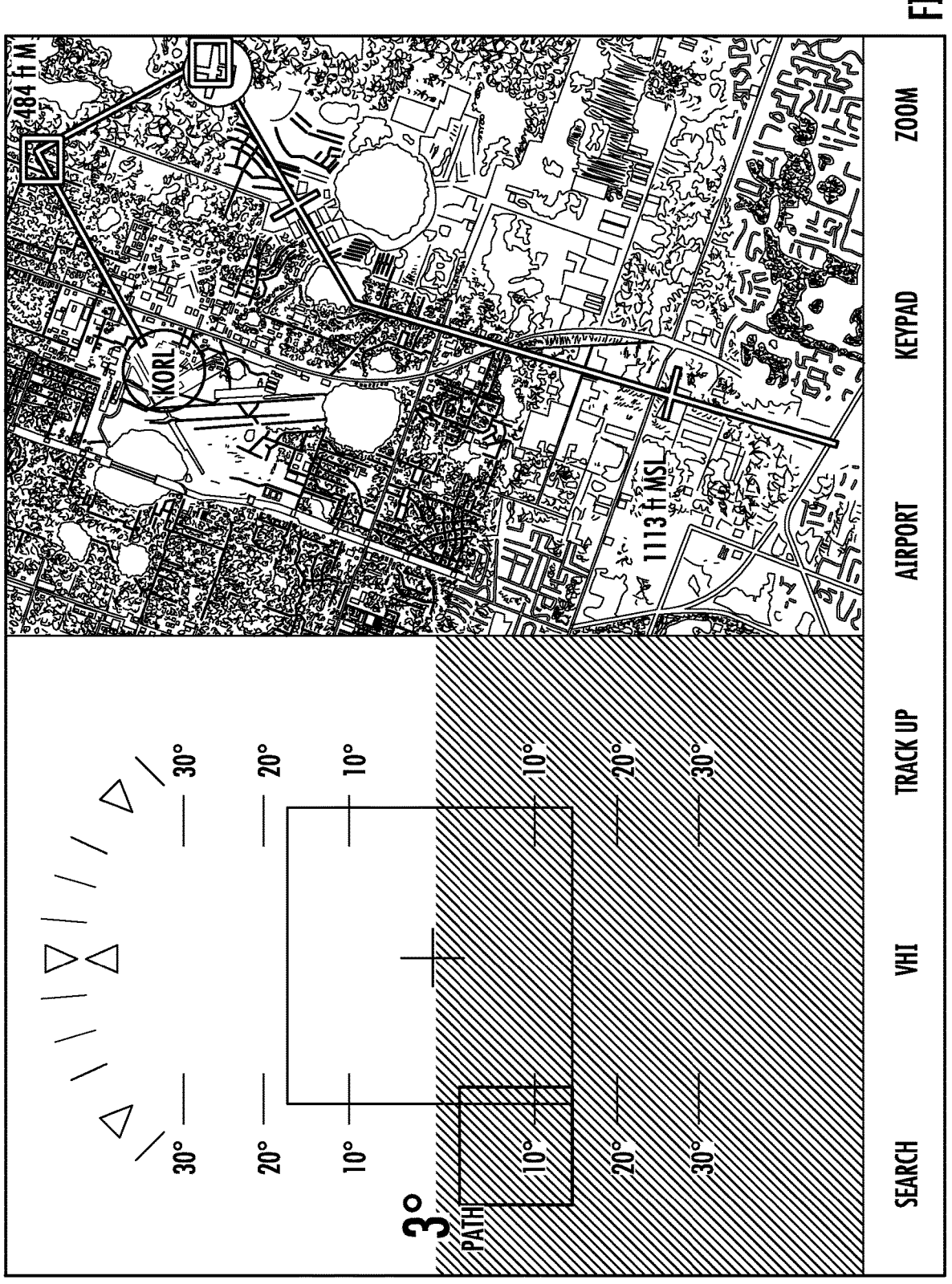

Referring to FIG. 42, the aircraft is on the turning point between the base leg and final leg. At the moment captured in this figure, the two check boxes on the overhead graphical view are still the turning point between the downwind leg and the base leg and the turning point between the base leg and the final leg. HUD shows the square guidance box still on the left side of the aircraft, but more in the center than shown in FIG. 39. This indicates the pilot will need to make a minor left turn to follow the planned approach and landing path.

Figure 43:
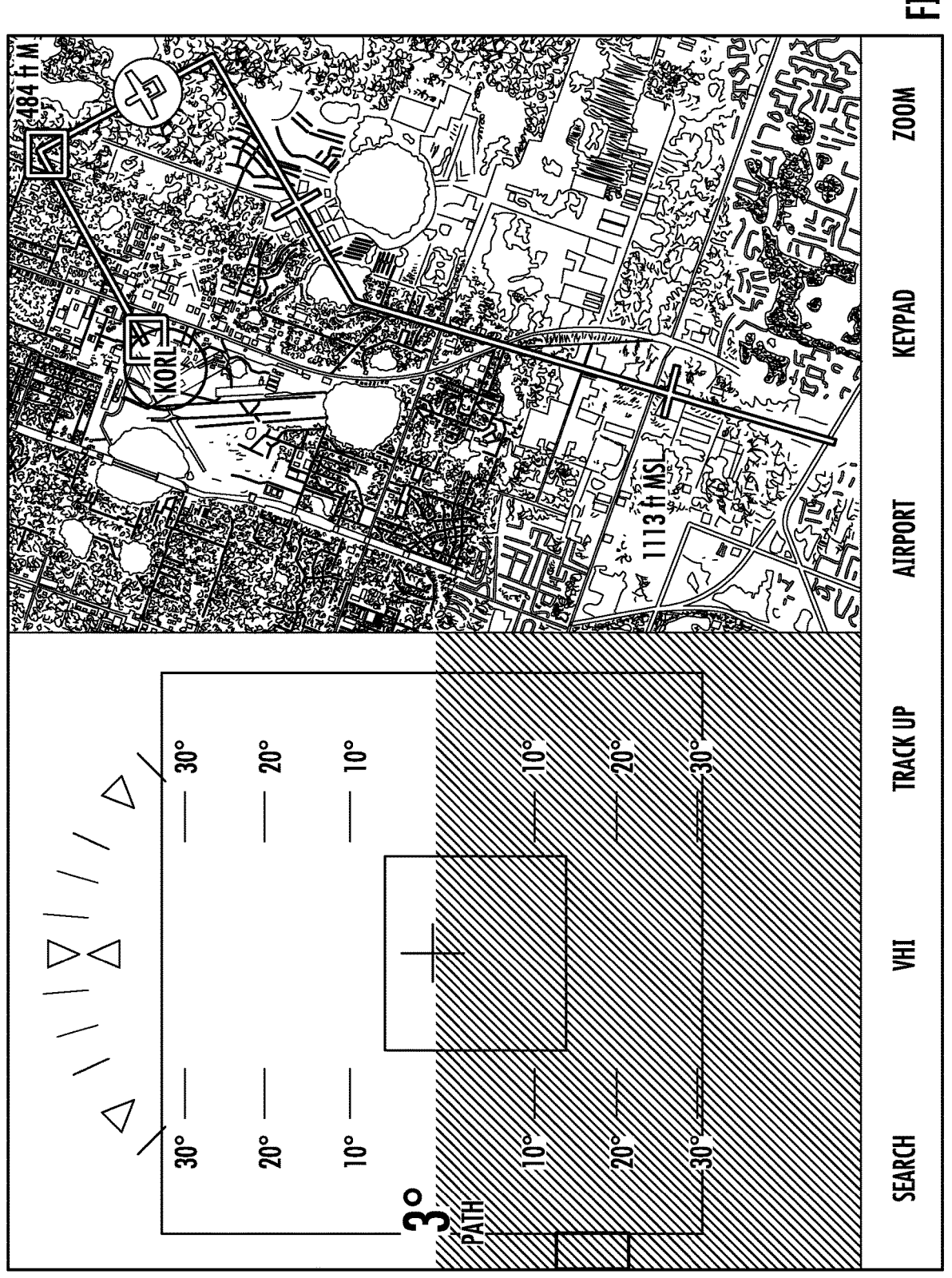

Referring to FIG. 43, the aircraft has flown through the turning point between the downwind leg and the base leg. At the moment captured in this figure, the two check boxes on the overhead graphical view are the turning point between the base leg and the final leg and a landing point. HUD shows the guidance box on the left side of the aircraft, meaning the pilot will need to turn the aircraft to the left to follow the planned landing path.

Figure 44:
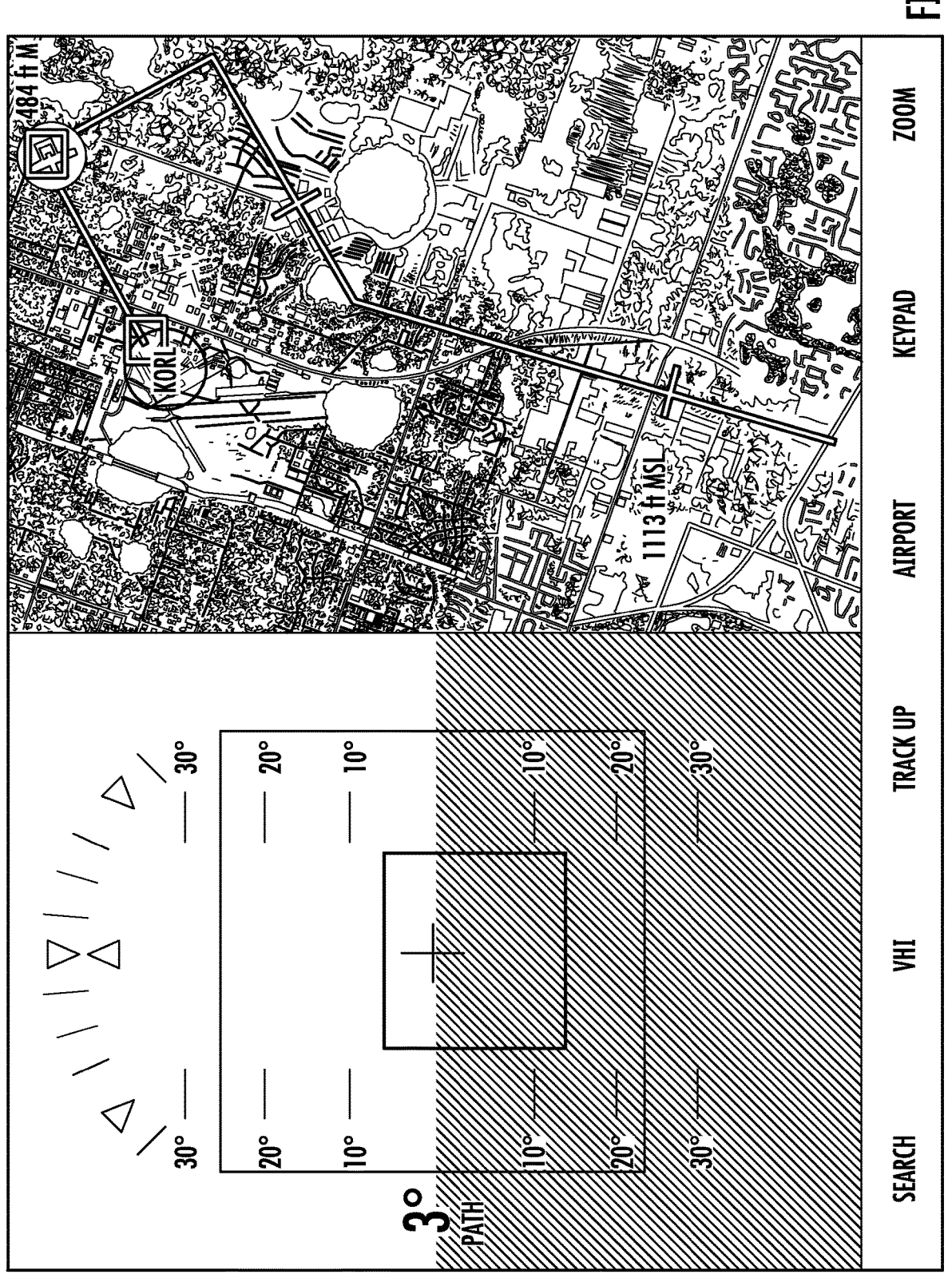

Referring to FIG. 44, the aircraft is flowing through the turning point between the base leg and final leg. At the moment captured in this figure, the two check boxes on the overhead graphical view are the turning point between the base leg and final leg and a landing point. HUD shows the aircraft in the center of the two vertical sides of the square guidance box, and on the upper portion of the square guidance box. This indicates a pilot will need to decrease the altitude slightly of the aircraft to follow the planned landing path.

Figure 45:
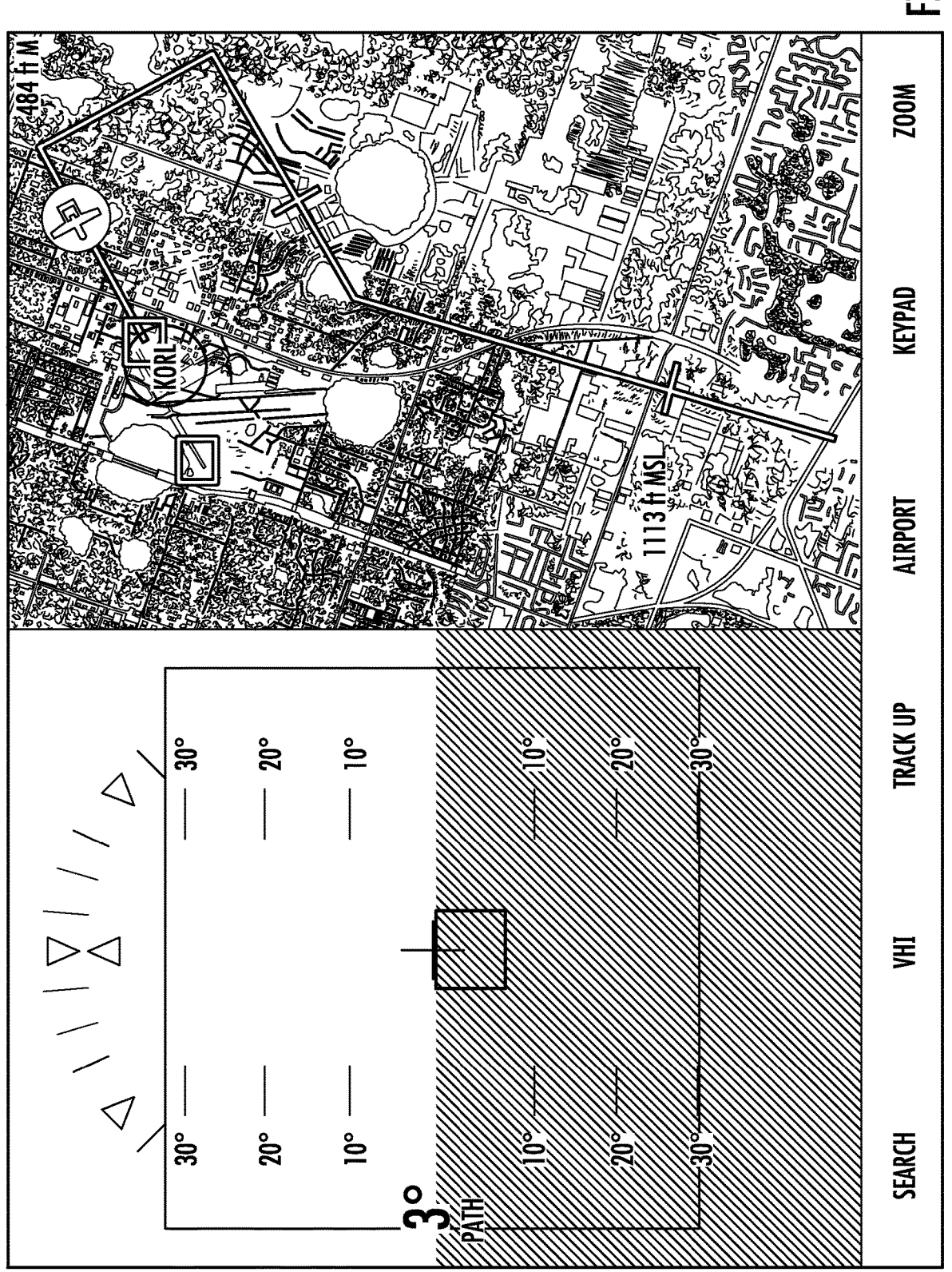

Referring to FIG. 45, the aircraft is flying at the final leg. At the moment captured in this figure, the two check boxes on the overhead graphical view are the landing point and a distant point along with the runway and the final leg. HUD shows the square guidance box on the center between the two vertical sides of the square guidance box, but the aircraft is on the top of the square guidance box, meaning a pilot will need to decrease the altitude of the aircraft to follow the planned landing path.

Figure 46:
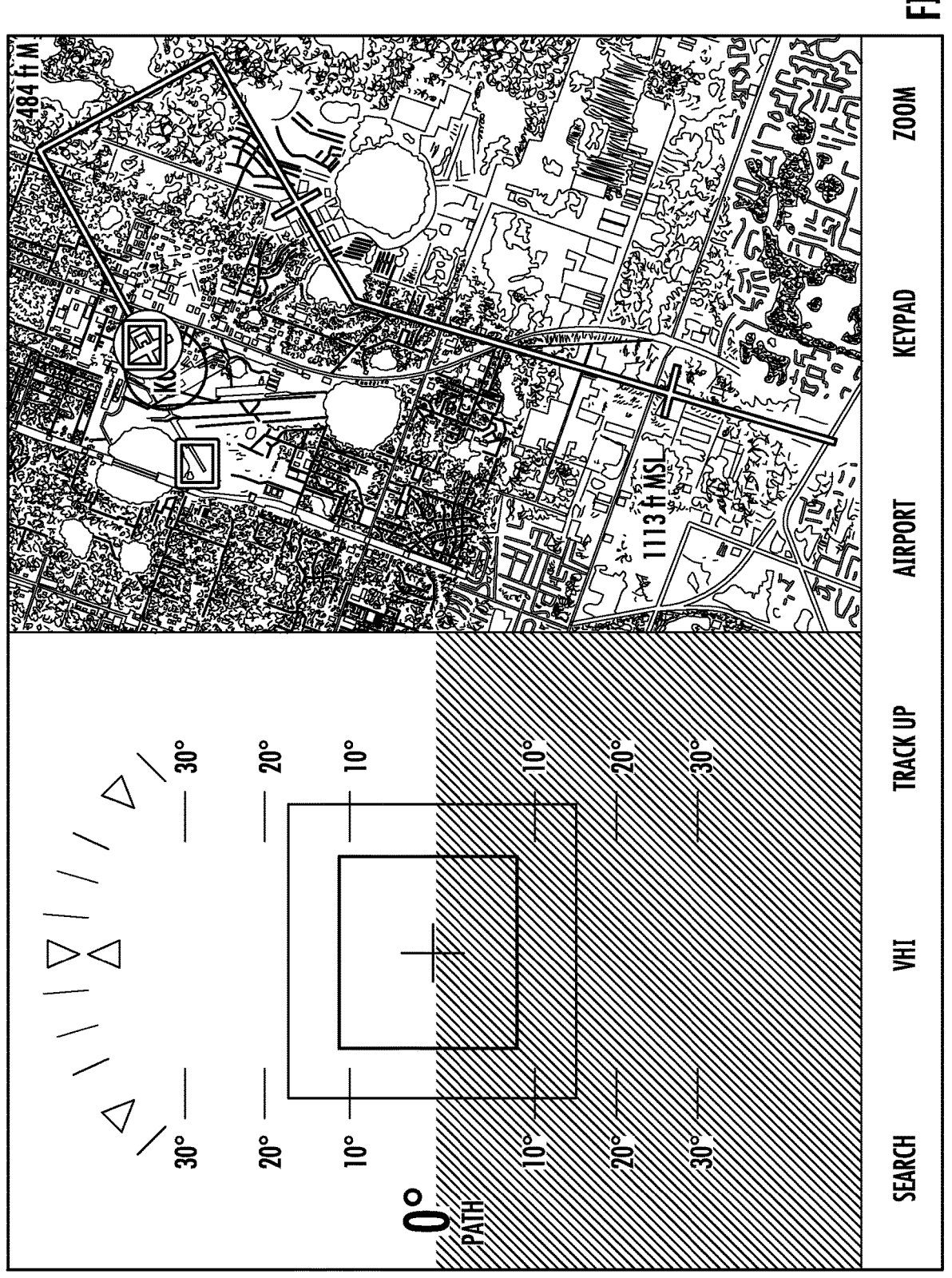

Referring to FIG. 46, the aircraft is landing. At the moment captured in this figure, the two check boxes in overhead graphical view are the same as those in FIG. 45. HUD shows the aircraft symbol in the center of the square box, meaning a pilot is right on the planned landing path and is expected to have a successful landing.

It can be seen from FIGS. 33-46 that as the aircraft gets closer to intercept, the size of the square box can increase in HUD and then fades away as an aircraft lands safely. The size, shape and color of the square box on the HUD can be customized as desired.

In an approach and/or landing, a pilot only needs to maneuver the aircraft to make it go through the center of the moving guidance box and lead down to a runway or landing surface. The HUD enables a pilot to view the status of approach and landing without refocusing to view outside of an aircraft and/or other instruments on the aircraft instrument panel. The HUD makes the aircraft's approach and landing intuitive and significantly improves the safety of landing.

Figure 47:
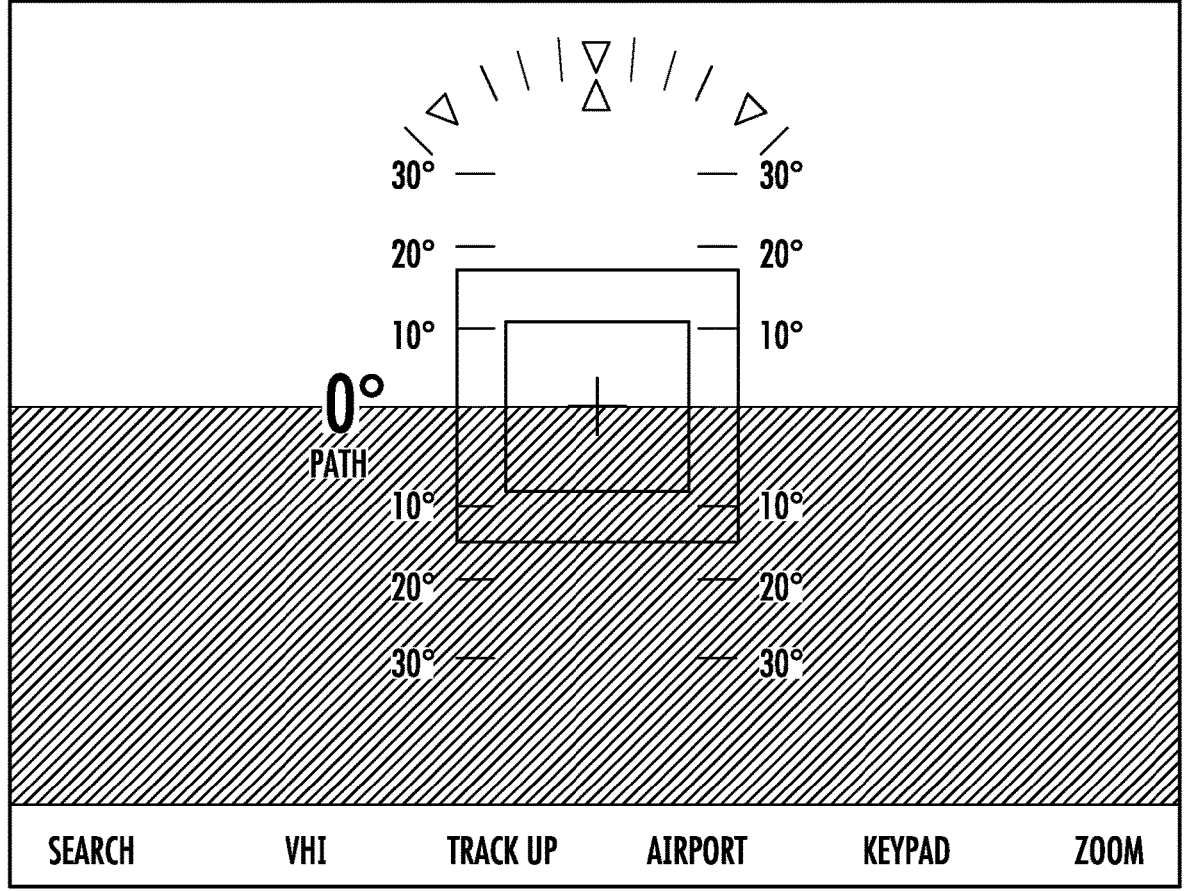
FIG. 47 is an example full screen view of a head-up display.

FIG. 47 indicates a full screen HUD rather than a split view as shown in FIGS. 31-44 when a user desires.

Figure 48:
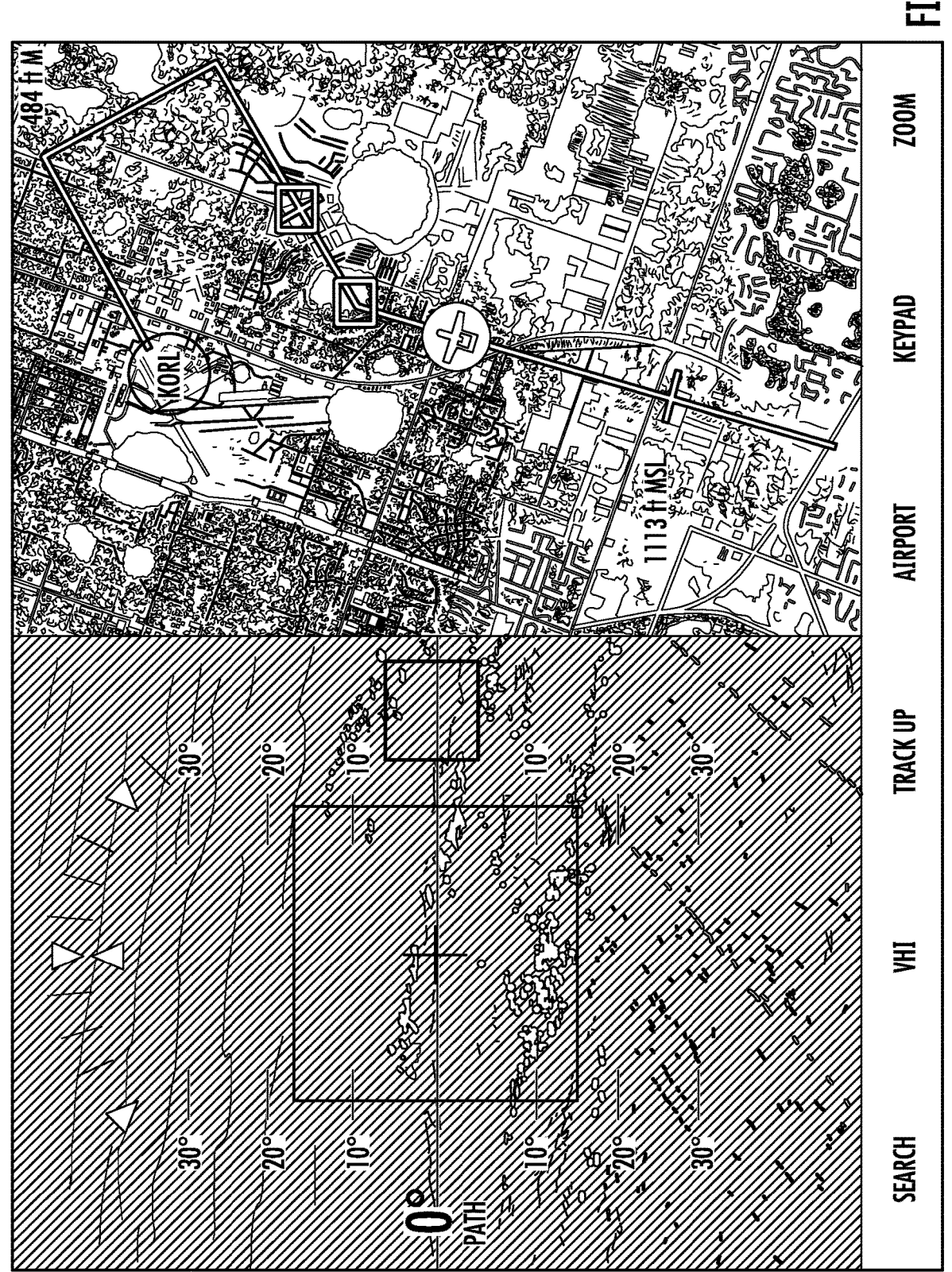
FIG. 48 is a split screen view having a head-up display superimposed on a camera view.
Figure 49:
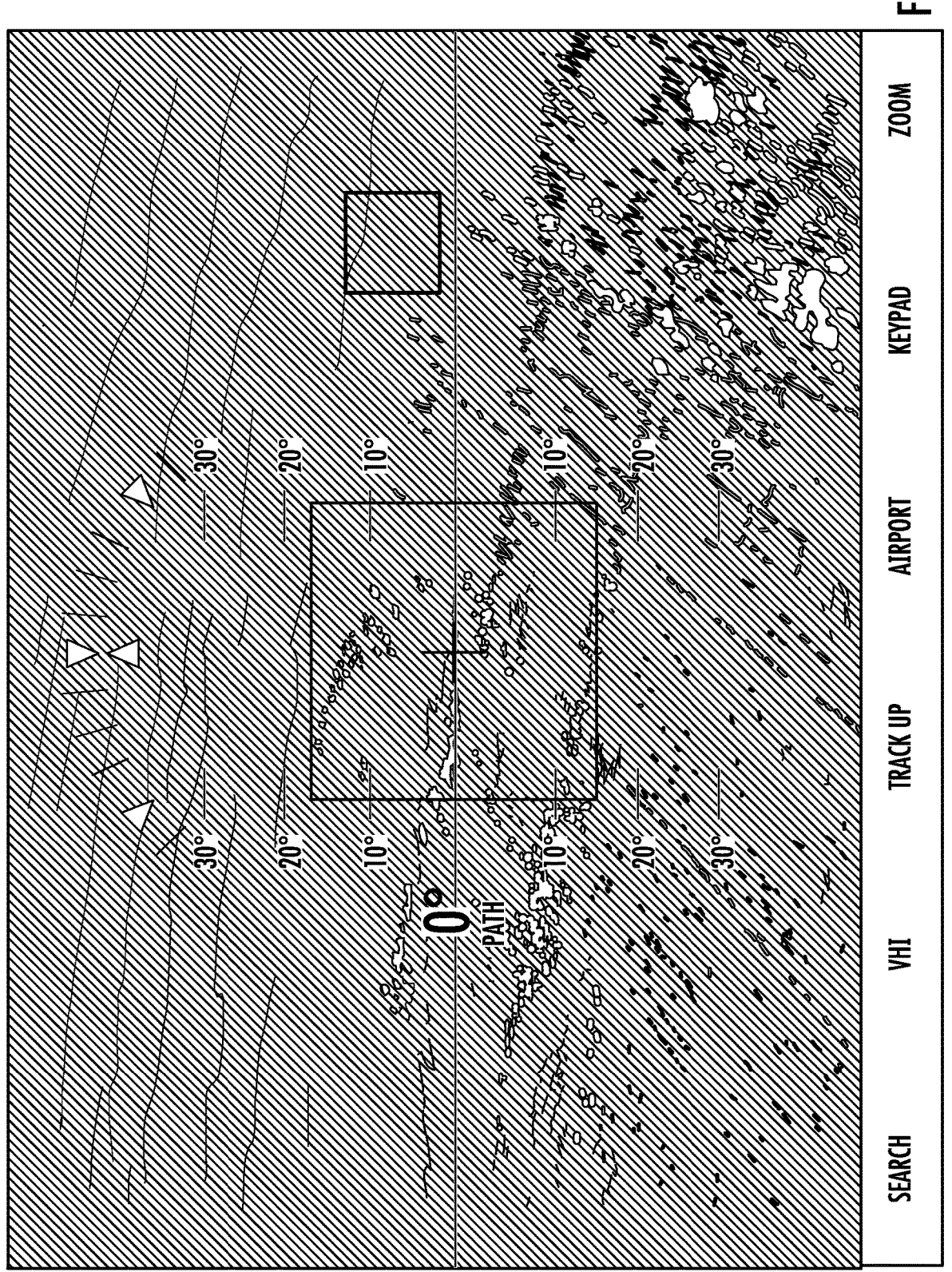
FIG. 49 is a full screen view of an augmented reality head-up display.

FIG. 48 is a split screen view of a HUD superimposed on a camera view on the left side and an overhead graphical view on the right side. The superimposed HUD can provide a realistic and intuitive view of the outside world. FIG. 49 is a full-screen HUD display of FIG. 48.

Figure 50:
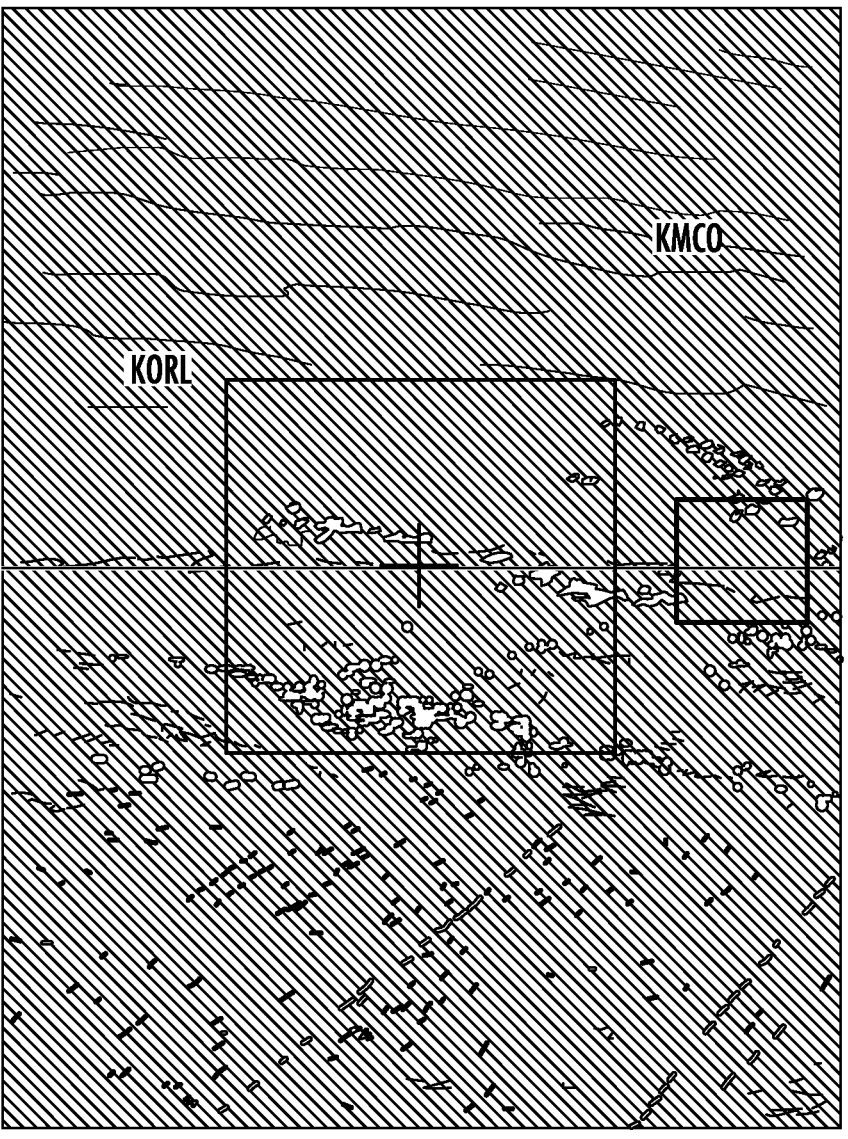
FIG. 50 illustrates a head-up display on a user's mobile device or a visor on a helmet.

FIG. 50 illustrates a HUD on a user's mobile device or a visor on a helmet. This enables the system 10 to be incorporated into a real or a simulated (e.g., gaming) environment.

In addition to providing the overhead graphical and HUD views of an approach, the system could interface with an autopilot system to automatically execute the heading, speed and/or altitude for all phases of the visual approach. Also, in addition to use onboard conventionally piloted aircraft, the system could be advantageously used to facilitate selection, modification, confirmation and/or execution of approach parameters for remotely-piloted and/or autonomous aircraft.

Referring to FIG. 51, according to one embodiment of the present invention, a method for facilitating aircraft approach includes, at step 5102, storing information on one or more airfields and one or more approach patterns associated with the one or more airfields in a database of a computer-based system. The airfield information stored in the database includes airfield information, runway information and runway end information. As an example, the airfield information includes coordinates, an identifier, a designator, a location indicator, name, type, filed elevation, ownership type, manager and radio frequency associated with one or more airfields. As another example, runway information includes an identifier, designator, length, width, composition, surface condition, and longitude and latitude of runway ends. As another example, the runway end information includes an identifier, a designator, coordinates, bearing, elevation, elevation of a touchdown zone, and a glide path associated with the runway end.

At step 5104, an approach pattern is selected based on location and movement of an aircraft via a user input interface of the computer-based system. An approach pattern selection includes conducting a text entry search for airfields stored in the database based on one or more criteria (e.g., city, state, airfield designator, and airfield name, etc.). The approach pattern can be selected based on one or more of airfield name, airfield identifier, and aircraft location. In one embodiment, if an approach pattern is not available for selection, a suitable approach pattern can be created via inputting aircraft and runway information.

At step 5106, the aircraft movement corresponding spatially to the selected approach pattern is determined via a processing unit of the computer-based system. As another example, rate of descent is determined if the aircraft is a helicopter. The approach pattern is periodically updated in response to the aircraft movement. When a runway the aircraft approaches is moving, a real-time location of the moving runway is taken into account in calculating aircraft movement corresponding spatially to the selected approach pattern.

At step 5108, the aircraft movement corresponds spatially to the approach pattern in a selected view is displayed via a display screen of the computer-based system. As an example, selected view includes a glide path guidance indicator indicating whether an aircraft is vertically above or below a glide path. As another example, a selected view includes an overhead graphical view (e.g., aerial view, satellite view) showing one or more of a runway, a pattern altitude, an entry angle, and respective lengths associated with and one or more altitude gates and descent gates associated with the approach pattern. Other views such as HUD can be superimposed on a camera view. The selected view can also include one or more of aircraft coordinate, altitude, horizontal accuracy, vertical accuracy, course, speed, timestamp of the aircraft in real-time. The selected view can be displayed in a specific orientation. Colored indicators are used to distinguish between different types of airfields. An airfield information diagram and a standard aviation chart can also be displayed on the display screen if needed.

It will be appreciated that the user interface implemented by the system and method of the claimed invention allows for a highly intuitive maneuver guidance for pilots, enhancing safety of arrival, approach and landing. The system can be used to facilitate aircraft arrival, approach, and landing is real-time. The system can be used by student pilot, novice, and airline pilots, instructors, air traffic controllers, airfield operators, military, and regulatory agencies. The system provides an enhanced experience in performing a safe approach and landing at any moving runway in the world. The system can also be used in traffic simulation in gaming environment.

The disclosed method does not require maintenance of ILS and greatly reduces maintenance cost. The system is also versatile and can be used for any moving landing surface anywhere in the world. The disclosed user interface system can be used by aircraft, such as helicopters, airplanes and unmanned aerial vehicles.

From the foregoing, it will be appreciated the system and method of the present invention implement a user interface that allows a computer to facilitate the complex, changeable and circumstance dependent aircraft landing and approach evolutions. As discussed above, the computer-based system and method can also advantageously interface with autopilots, navigational systems and other networks and devices to further facilitate landing and approach. The computer-based system can also be used in aircraft departure. In this scenario, aircraft departure pattern can be calculated and displayed.

The above embodiments are provided for exemplary and illustrative purposes; the present invention is not necessarily limited thereto. Rather, those skilled in the art will appreciate that various modification, as well as adaptations to particular circumstances, will fall within the scope of the invention as herein shown and described.

What is claimed is:

1. A method for facilitating aircraft approach comprising:
    storing information of one or more airfields and one or more approach patterns associated with the one or more airfields in a database of a computer based system, wherein the information of one or more airfields includes runway information;
    selecting an airfield for approach and generating a default approach pattern based on location and movement of an aircraft and the airfield selected via a user input interface of the computer based system;
    calculating the aircraft movement corresponding spatially to the selected default approach pattern via a processor of the computer based system;
    calculating a plurality of selectable approach pattern indicators each including at least one altitude gate and one descent gate, the indicators being dynamically recalculated in response to the aircraft movement or user modification for a selected runway; and
    displaying the aircraft movement and the plurality of selectable approach pattern indicators with the altitude and descent gates spatially corresponding to the default approach pattern or a selected approach pattern in an overhead graphical view via a display screen of the computer based system.

2. The method of claim 1, wherein the default approach pattern is generated based on one or more of airfield name, airfield identifier, and aircraft location and movement.

3. The method of claim 1, wherein generating the default approach pattern includes conducting a text entry search for airfields stored in the database based on one or more criteria.

4. The method of claim 3, wherein the criteria includes city, state, airfield designator, and airfield name.

5. The method of claim 1, wherein displaying the aircraft movement corresponding spatially to the default approach pattern is periodically updated in response to the aircraft movement.

6. The method of claim 1, wherein displaying the aircraft movement includes using colored indicators to distinguish between different types of airfields.

7. The method of claim 1, wherein further comprising displaying an airfield information diagram and a standard aviation chart on the display screen.

8. The method of claim 1, wherein the overhead graphical view includes a glide path guidance indicator indicating whether an aircraft is vertically above or below a glide path.

9. The method of claim 1, wherein the overhead graphical view includes a runway, a pattern altitude, an entry angle, and respective lengths associated with one or more altitude gates and descent gates of the plurality of selectable approach pattern indicators associated with the default or the selected approach pattern.

10. The method of claim 9, wherein the overhead graphical view includes an aerial view.

11. The method of claim 10, wherein the overhead graphical view includes a satellite view.

12. The method of claim 1, further comprising displaying a head-up display (HUD) view superimposed on a camera view.

13. The method of claim 1, further comprising displaying a full screen HUD view.

14. The method of claim 1, further comprising displaying a split view, wherein a head-up display (HUD) superimposed on a camera view is displayed on one side of the display screen and an overhead graphical view with approach pattern is displayed on the other side of the display screen.

15. The method of claim 1, further comprising displaying one or more of aircraft coordinate, altitude, horizontal accuracy, vertical accuracy, course, speed, timestamp of the aircraft in real-time.

16. The method of claim 1, further comprising displaying the selected view in a specific orientation.

17. The method of claim 1, wherein the airfield data stored in the database includes airfield information, runway information and runway end information.

18. The method of claim 17, wherein the airfield information includes a coordinate, an identifier, a designator, a location indicator, a name, a type, a filed elevation, an ownership type, a manager and radio frequency associated with one or more airfields.

19. The method of claim 17, wherein the runway information includes an identifier, designator, length, width, composition, surface condition, and longitude and latitude of runway ends.

20. The method of claim 17, wherein the runway end information includes an identifier, a designator, coordinates, bearing, elevation, elevation of a touchdown zone, a glide path associated with the runway end.

21. The method of claim 1, wherein calculating the aircraft movement corresponding spatially to the selected approach pattern includes calculating vertical rate of descent if the aircraft is a helicopter and displaying the aircraft movement corresponds spatially to the approach pattern includes displaying a descent rate target indicator.

22. The method of claim 1, wherein when an aircraft is approaching a moving runway, calculating the aircraft movement corresponding spatially to the selected approach pattern includes taking into account a real-time location of the moving runway with respective to aircraft movement.

23. A computer-based graphical user interface (GUI) system for facilitating aircraft approaching and landing on a moving runway comprising:

a runway position determination unit configured to determine location and movement of a moving runway in real time;

a processing unit having a processor configured to receive aircraft location and movement information from an aircraft location sensor;

receive runway location and movement information from the runway determination unit;

calculate an approach pattern based on real time location of the aircraft and runway; and calculate a plurality of selectable approach pattern indicators each including at least one altitude gate and one descent gate, the indicators being dynamically recalculated in response to the movement of the aircraft or movement of the moving runway; and a display screen with user input interface configured for:

inputting at least one of a runway and associated airfield information for approaching and a specific display format; and displaying the calculated approach pattern in the specific display format and the plurality of selectable approach pattern indicators with the altitude and descent gates spatially corresponding to the calculated approach pattern.

24. The system of claim 23, wherein the runway position determination unit is configured to receive signal via one or more transmitters on the moving runway indicative location and orientation of the runway.

25. The system of claim 23, the aircraft location and movement is determined by one or more of global positioning system (GPS) and inertial navigation system (INS) system, a camera, a laser sensor, and computer vision.

26. The system of claim 23, wherein determining an approach pattern includes determining a descent profile.

27. The system of claim 26, wherein the descent profile includes a descent trajectory, an altitude, a speed, an approach pattern, a length of downwind, and an entry angle associated with the descent profile.

28. The system of claim 23, wherein the processing unit is further configured to access a third party database to received aircraft weight, terrain data, and weather data to determine the approach pattern.

29. The system of claim 23, wherein the display screen is configured to display a glide path guidance indicator indicating whether the aircraft is vertically above or below a descent profile.

30. The method of claim 23, wherein the display screen is configured to display a head-up display (HUD) superimposed on a camera view.

31. The method of claim 23, wherein the display screen is configured to display a full screen HUD.

32. The method of claim 23, wherein the display screen is configured to display a split view, wherein a head-up display (HUD) superimposed on a camera view is displayed on one side of the display screen and an overhead graphical view showing the approach pattern on the other side of the display screen.

33. The method of claim 32, wherein the HUD includes a moving guidance box indicating a real time reference point along the approach pattern.

34. The method of claim 33, wherein two vertical lines of the guidance box indicate the aircraft horizontal position relative to the approach pattern.

35. The method of claim 34, wherein two horizontal lines of the guidance box indicate the aircraft vertical position relative to the approach pattern.

36. A computer-based system for facilitating aircraft approach and landing comprising:

a database storing airfield information for at least one airfield, the airfield information including runway information;

a user input interface configured for selecting an airfield for approach and a display format;

a processing unit having at least one processor and being in signal communication with the database and the user input interface, the processing unit being configured for:

determining aircraft position and movement in relation to a selected airfield;

calculating an approach pattern based on the aircraft position and each runway at the selected airfield;

after receiving a runway selection from the user input interface, calculating a plurality of selectable approach pattern indicators each including at least one altitude gate and one descent gate, the indicators being dynamically recalculated in response to aircraft movement or user modification, for the selected runway; and a display screen configured for displaying an overhead graphical view of the aircraft movement and the plurality of selectable approach pattern indicators with the altitude and descent gates spatially corresponding to the calculated approach pattern for the runway selection in a selected display format.

37. The computer based system of claim 36, wherein the processing unit is further configured for calculating a new approach pattern if at least one of the selectable approach pattern indicators do not apply to a current aircraft position and movement.

38. The system of claim 36, wherein calculating an approach pattern includes calculating aircraft descent rate on an approach path.

39. The system of claim 36, wherein calculating an approach pattern includes calculating a vertical descent rate if the aircraft is a helicopter.

40. The system of claim 36, wherein the user input interface includes a data entry keypad or touchscreen.

41. The system of claim 40, wherein the user input interface is dynamically updated based on current aircraft position and movement relative to the calculated approach pattern.

42. The system of claim 41, wherein defining the airfield information includes input of at least one of a latitude, a longitude, an altitude relative to MSL, a length and a bearing associated with the runway.

43. The system of claim 40, wherein the user input interface is displayed to define a runway on the display screen.

44. The system of claim 36, further comprising a runway position determination unit configured to determine real time position of the runway when the runway is moving.

45. The system of claim 36, wherein the database is configured to store airfield information for a plurality of airfields.

46. The system of claim 45, wherein the user input interface is configured to search for a suitable airfield stored in the database for approaching.

47. The system of claim 46, wherein the user input interface is configured for enabling a text entry search for airfields stored in the database based on one or more criteria.

48. The system of claim 47, wherein the criteria includes city, state, airfield designator, and airfield name.

49. The system of claim 45, wherein the airfield information stored in the database includes airfield information, runway information and runway end information.

50. The system of claim 45, wherein the airfield information includes coordinates, an identifier, a designator, a location indicator, name, type, field elevation, ownership type, manager and radio frequency associated with one or more airfields.

51. The system of claim 45, wherein the runway information includes an identifier, designator, length, width, composition, surface condition, and longitude and latitude of runway ends.

52. The system of claim 45, wherein the runway end information includes an identifier, a designator, a coordinate, a bearing, an elevation, an elevation of a touchdown zone, and a glide path.

53. The system of claim 36, wherein the display screen is periodically updated in response to the aircraft movement.

54. The system of claim 36, wherein the display screen is configured to use colored indicators to distinguish between different types of airfields.

55. The system of claim 36, wherein the selected view includes one or more of aircraft coordinate, altitude, horizontal accuracy, vertical accuracy, course, speed, timestamp of the aircraft in real-time.

56. The system of claim 36, wherein the selected view includes an overhead graphical view including a runway, a pattern altitude, an entry angle, and respective lengths associated with and one or more altitude gates and descent gates associated with the approach pattern.

57. The system of claim 56, wherein the overhead graphical view includes an aerial view.

58. The system of claim 56, wherein the overhead graphical view includes a satellite view.

59. The system of claim 36, wherein the display screen is configured to display the selected view in a specific orientation.

60. The system of claim 36, wherein the display screen is further configured to display head-up display (HUD) superimposed on a camera view.

61. The system of claim 36, wherein the display screen is configured to display a full screen HUD.

62. The system of claim 36, wherein the display screen is configured to display a split view, wherein a head-up display (HUD) superimposed on a camera view is displayed on one side of the display screen and an overhead graphical view showing the approach pattern on the other side of the display screen.

63. The system of claim 62, wherein the HUD includes a moving guidance box indicating a real time reference point along the approach pattern.

64. The system of claim 63, wherein two vertical lines of the guidance box indicate the aircraft horizontal position relative to the approach pattern.

65. The system of claim 64, wherein two horizontal lines of the guidance box indicate the aircraft vertical position relative to the approach pattern.

66. The system of claim 36, wherein the user interface is further configured to define a runway and includes a graphical user interface depicting a geographical area and is further configured to receive a touch input indicating a runway location within the depicted geographical area.

67. The system of claim 36, wherein the processing unit is further configured to supply the calculated approach pattern as an input to an autopilot to automatically execute a heading, speed, or altitude for the approach.

68. The system of claim 36, wherein the processing unit is configured to automatically search for a suitable airfield by searching for a nearest airfield based on the aircraft position when an emergency on the aircraft has been detected.

69. The system of claim 68, wherein the search for the nearest suitable is based on operator-specified criteria and criteria based on type of aircraft, and at least one of elevation, length, width, composition, and surface condition.

70. The system of claim 69, wherein the system is configured to facilitate selection, modification, confirmation, or execution of the calculated approach pattern remotely from the aircraft, wherein the aircraft is configured to be remotely piloted or comprises an autonomous aircraft.

* * * * *